(12) United States Patent
Angadjivand et al.

(10) Patent No.: US 7,989,371 B2
(45) Date of Patent: *Aug. 2, 2011

(54) MELTBLOWN FIBER WEB WITH STAPLE FIBERS

(75) Inventors: Seyed A. Angadjivand, Woodbury, MN (US); John M. Brandner, St. Paul, MN (US); James E. Springett, Webster, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 542 days.

This patent is subject to a terminal disclaimer.

(21) Appl. No.: 11/766,870

(22) Filed: Jun. 22, 2007

(65) Prior Publication Data

US 2008/0318024 A1 Dec. 25, 2008

(51) Int. Cl.
*D04H 3/00* (2006.01)
*D04H 3/16* (2006.01)
*D02G 3/04* (2006.01)
*D01D 5/08* (2006.01)

(52) U.S. Cl. ........ 442/400; 442/334; 442/340; 442/344; 442/401; 428/221; 428/373; 264/172.17; 264/172.19

(58) Field of Classification Search ........... 442/334, 442/340, 344, 400, 401; 428/36.1, 221, 373; 128/205.29–206.24; 264/172.17, 172.18, 264/172.19, 299, 45.3
See application file for complete search history.

(56) References Cited

U.S. PATENT DOCUMENTS

| 3,016,599 A | 1/1962 | Perry, Jr. |
| 3,073,735 A | 1/1963 | Till |
| 3,981,650 A | 9/1976 | Page |
| 4,118,531 A | 10/1978 | Hauser |
| 4,215,682 A | 8/1980 | Kubik et al. |
| 4,536,361 A | 8/1985 | Torobin |
| 4,536,440 A | 8/1985 | Berg |
| 4,714,647 A | 12/1987 | Shipp, Jr. et al. |
| 4,807,619 A | 2/1989 | Dyrud et al. |
| 4,931,355 A | 6/1990 | Radwanski et al. |
| 5,350,620 A * | 9/1994 | Sundet et al. ................ 428/172 |
| 5,480,466 A | 1/1996 | Jackson et al. |
| 5,496,507 A | 3/1996 | Angadjivand et al. |
| 5,582,907 A | 12/1996 | Pall |
| 5,591,335 A * | 1/1997 | Barboza et al. ............ 210/323.2 |
| 5,607,491 A | 3/1997 | Jackson |
| 5,641,555 A | 6/1997 | Berrigan et al. |
| 5,656,368 A | 8/1997 | Braun et al. |

(Continued)

FOREIGN PATENT DOCUMENTS

CA 2647800 10/2007

(Continued)

OTHER PUBLICATIONS

U.S. Appl. No. 11/461,128; Stelter, John D.; filed Jul. 31, 2006; 29 pages.

(Continued)

*Primary Examiner* — Angela Ortiz
*Assistant Examiner* — Jennifer Steele
(74) *Attorney, Agent, or Firm* — Kenneth B. Wood

(57) ABSTRACT

A porous nonwoven web and method of making are disclosed, wherein the web contains meltblown fibers and staple fibers. The meltblown fibers may be present as a bimodal mixture of microfibers and mesofibers, and comprise an intermingled mixture with staple fibers further intermingled therein.

20 Claims, 9 Drawing Sheets

U.S. PATENT DOCUMENTS

| | | | |
|---|---|---|---|
| 5,685,757 A | 11/1997 | Kirsch et al. | |
| 5,783,011 A | 7/1998 | Barboza et al. | |
| 5,853,628 A | 12/1998 | Varona | |
| 5,873,968 A | 2/1999 | Pike et al. | |
| 5,919,847 A | 7/1999 | Rousseau et al. | |
| 5,968,635 A | 10/1999 | Rousseau et al. | |
| 5,993,943 A | 11/1999 | Bodaghi et al. | |
| 6,041,782 A | 3/2000 | Angadjivand et al. | |
| 6,057,256 A | 5/2000 | Krueger et al. | |
| 6,183,670 B1 | 2/2001 | Torobin et al. | |
| 6,269,513 B1 | 8/2001 | Torobin | |
| 6,315,806 B1 | 11/2001 | Torobin et al. | |
| 6,319,865 B1 | 11/2001 | Mikami | |
| 6,827,764 B2 | 12/2004 | Springett et al. | |
| 6,923,182 B2 | 8/2005 | Angadjivand et al. | |
| 2001/0003082 A1* | 6/2001 | Kahlbaugh et al. | 442/340 |
| 2002/0116910 A1 | 8/2002 | Berger | |
| 2004/0016345 A1 | 1/2004 | Springett | |
| 2004/0097155 A1* | 5/2004 | Olson et al. | 442/352 |
| 2004/0211160 A1 | 10/2004 | Rammig | |
| 2005/0136781 A1 | 6/2005 | Lassig | |
| 2008/0022643 A1* | 1/2008 | Fox et al. | 55/521 |
| 2008/0026173 A1* | 1/2008 | Angadjivand et al. | 428/36.1 |
| 2008/0026659 A1 | 1/2008 | Brandner | |
| 2008/0026661 A1 | 1/2008 | Fox et al. | |
| 2008/0038976 A1 | 2/2008 | Berrigan et al. | |
| 2008/0315454 A1 | 12/2008 | Angadjivand et al. | |
| 2008/0318014 A1 | 12/2008 | Angadjivand et al. | |

FOREIGN PATENT DOCUMENTS

| | | |
|---|---|---|
| EP | 0646663 A | 4/1995 |
| JP | 5-186240 | 7/1993 |
| WO | WO 2007-112877 | 10/2007 |

OTHER PUBLICATIONS

U.S. Appl. No. 11/461,136; Brandner, John M.; filed Jul. 31, 2006; 39 pages.

U.S. Appl. No. 11/461,145; Angadjivand, Seyed A.; filed Jul. 31, 2006; 62 pages.

U.S. Appl. No. 11/693,017; Angadjivand, Seyed A.; filed Mar. 29, 2007; 26 pages.

U.S. Appl. No. 11/693,186; Angadjivand, Seyed A.; filed Mar. 29, 2007; 47 pages.

* cited by examiner

MELTBLOWN FIBER WEB WITH STAPLE FIBERS

BACKGROUND

Porous webs comprising meltblown fibers are in widespread use in applications such as filtration of particulates and removal of oil from water, and as acoustic or thermal insulation. Such webs have been made from thermoplastic resins using melt-blowing techniques of the type described in Report No. 4364 of the Naval Research Laboratories, published May 25, 1954, entitled "Manufacture of Super Fine Organic Fibers" by Van A. Wente et al.

In the formation of such fiber webs, it has sometimes been found advantageous to use different polymers that have different characteristics. For example, U.S. Pat. No. 3,981,650 to Page describes a melt blowing die which is capable of simultaneously producing plastic filaments from two different polymers.

Meltblown fiber webs have also been made with different diameter fibers. For example, U.S. Pat. No. 5,783,011 to Barboza et al. discloses a filtration medium that is formed of a mass of nonwoven melt blown support and filtration fibers which are integrally co-located with one another. The support fibers have, on average, relatively larger diameters as compared to the filtration fibers.

In addition, U.S. Pat. No. 6,315,806 to Torobin et al. describes a composite filtration medium web of fibers containing a controlled dispersion of a mixture of sub-micron and greater than sub-micron diameter polymeric fibers.

U.S. Pat. No. 6,319,865 to Mikami describes a nozzle piece that gives melt-blown nonwoven fabric in one step, composed of fine fibers having a diameter in a range of from 1 to 10 µm.

So-called staple fibers have also been added to meltblown nonwoven webs. For example U.S. Pat. No. 6,827,764 to Springett et al. describes a filter element that comprises a porous molded web that contains thermally bonded staple fibers and non-thermally bonded electrically charged meltblown fibers.

SUMMARY

Herein is disclosed a porous web that comprises an intermingled mixture of staple fibers and meltblown fibers, and apparatus and methods for making such webs. In one embodiment, the meltblown fibers are present in a bimodal fiber diameter distribution comprising an intermingled mixture of meltblown microfibers and meltblown mesofibers. In one embodiment, the microfibers and mesofibers are of the same polymeric composition. Such porous webs (hereafter termed "bimodal fiber mixture webs") can possess a number of advantageous properties due to their intermingled combination of staple fibers, mesofibers, and microfibers. While not being limited by theory or mechanism, it may be that the staple fibers can impart the web with loftiness, low solidity, and/or resistance to compaction, which can aid in achieving desirable depth filtration capability and ability to resist plugging. It may further be that the mesofibers, by virtue of their length and/or their ability to bond to the microfibers, can impart mechanical strength and integrity to the web, which can be advantageous in permitting such lofty and low solidity webs to be handled through processes such as hydrocharging and molding. And, the microfibers may serve to aid in the capture and filtration of fine particles.

Bimodal fiber mixture webs can provide excellent filtration capability in a flat, as-formed configuration, and also in a molded or shaped state. In certain embodiments, bimodal fiber mixture webs can have the advantage of being able to filter large quantities of particles without becoming plugged or developing high pressure drops. Such webs may be useful in various applications including for example the filtration of welding fumes.

A bimodal fiber mixture web may be used alone or may be used in combination with (e.g. laminated to) another layer of filtration media (e.g. a membrane, web, etc.) of different composition, porosity, structure and/or filtration properties. In some embodiments two bimodal fiber mixture webs may be layered together for use. In certain embodiments a bimodal fiber mixture web may be used as a prefilter for a secondary filtration layer; e.g., a secondary filtration layer that has a finer pore size. In this manner, the excellent depth loading and storage capacity of the fiber mixture web may serve to prevent the secondary filtration layer from becoming plugged or saturated as quickly as it might in the absence of the fiber mixture web.

In certain embodiments, the disclosed bimodal fiber mixture webs can have a number of additional beneficial properties. For example, in some embodiments, bimodal fiber mixture webs can be relatively thick, and/or low in solidity. Bimodal fiber mixture webs may also be moldable into a desired shape while preserving advantageous thickness, solidity, and/or filtration properties. For example, in some embodiments such webs can be molded without unduly compacting the web (which might result in lower porosity, higher pressure drop, and other properties that may be undesirable).

The disclosed webs may be used in a variety of flat or molded respirator applications, and in a variety of non-respirator filtration applications, including HVAC (e.g., furnace) filters, vehicle cabin filters, clean room filters, humidifier filters, dehumidifier filters, room air purifier filters, hard disk drive filters and other flat or pleatable supported or self-supporting filtration articles. The disclosed nonwoven webs may also be used for applications other than air filtration, e.g., for liquid (e.g., medical) filters, packaging materials, shoe components including uppers, sole components and inserts, and for apparel including outerwear, activewear, and hazardous material garments.

In one aspect, herein is disclosed a porous nonwoven web comprising staple fibers intermingled with meltblown fibers; wherein the meltblown fibers comprise a bimodal mixture of intermingled microfibers and mesofibers; and, wherein there are at least five times as many microfibers as mesofibers and wherein the mesofibers comprise at least about 30% by weight of the meltblown fibers.

Apparatus and processes are also herein disclosed via which meltblown webs can be produced comprising meltblown fibers of different fiber diameter. Such webs may include staple fibers and in one embodiment may comprise bimodal fiber mixture webs.

Applicant thus discloses in one aspect a process for forming a porous nonwoven web, comprising: flowing fiber-forming material through a meltblowing die comprising a die cavity in fluid communication with larger size orifices and in fluid communication with at least five times as many smaller size orifices, wherein a portion of the fiber-forming material flows through the larger size orifices to form larger diameter filaments, and a portion of the fiber-forming material flows through the smaller size orifices to form smaller diameter filaments; using air or other fluid to attenuate the filaments into a stream of intermingled meltblown fibers; introducing staple fibers into the stream of meltblown fibers, wherein the staple fibers and microfibers form a stream of intermingled fibers; and, collecting the mixed fibers as a nonwoven web containing an intermingled mixture of staple fibers and meltblown fibers; wherein the meltblown fibers comprise a bimodal mixture of intermingled microfibers and mesofibers, of the same polymeric composition.

Applicant discloses in another aspect a process for forming a porous nonwoven web, comprising: flowing fiber-forming material through a meltblowing die comprising a die cavity in fluid communication with larger size orifices and in fluid communication with at least five times as many smaller size orifices, wherein a portion of the fiber-forming material flows through the larger size orifices to form larger diameter filaments, and a portion of the fiber-forming material flows through the smaller size orifices to form smaller diameter filaments; using air or other fluid to attenuate the filaments into a stream of intermingled meltblown fibers; introducing staple fibers into the stream of meltblown fibers, wherein the staple fibers and meltblown form a stream of intermingled fibers; and, collecting the mixed fibers as a nonwoven web containing an intermingled mixture of staple fibers and meltblown microfibers and mesofibers; wherein the microfibers and mesofibers are of the same polymeric composition, and wherein there are at least about five times as many microfibers as mesofibers and wherein the mesofibers comprise at least about 30% by weight of the meltblown fibers.

These and other aspects of the invention will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Like reference symbols in the various figures of the drawing indicate like elements. The elements in the drawings are not to scale unless noted.

DETAILED DESCRIPTION

Glossary

Figure 1:
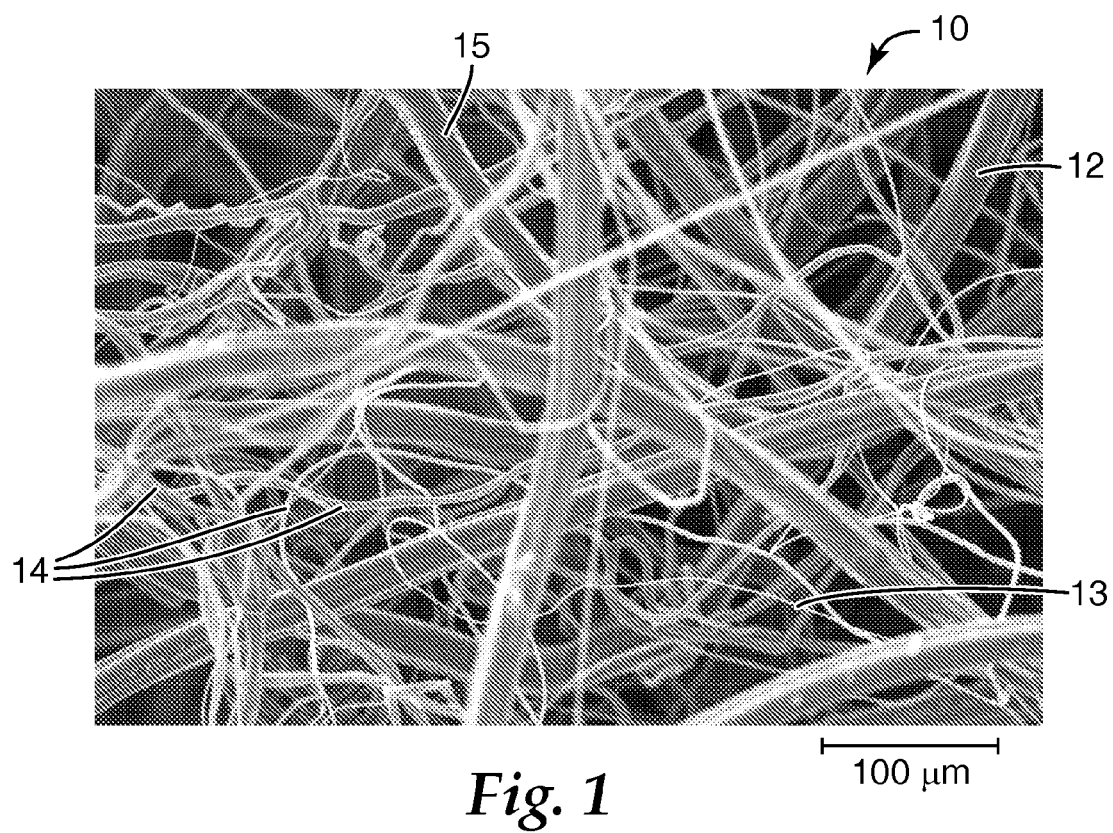
FIG. 1 is a photograph (magnified 100×) of an exemplary web comprising staple fibers and meltblown fibers.

"Meltblown" means formed by extruding a molten material through a plurality of orifices to form filaments while contacting the filaments with air or other attenuating fluid to attenuate the filaments into fibers, and thereafter collecting a layer of the attenuated fibers.

"Meltblown fibers" means fibers prepared by the meltblown process.

"Microfiber" means a meltblown fiber having a diameter (as determined using microscopy) of 10 μm or less; "ultrafine microfiber" means a microfiber having a diameter of two μm or less; and "submicron microfiber" means a microfiber having a diameter of one μm or less.

"Mesofiber" means a meltblown fiber having a diameter (as determined using microscopy) of greater than 10 μm.

"Bimodal fiber mixture web" means a nonwoven web comprising staple fibers intermingled with meltblown fibers, the meltblown fibers being present in a bimodal mixture of intermingled microfibers and mesofibers.

"Bimodal mixture of intermingled microfibers and mesofibers" means an intermingled mixture of microfibers and mesofibers, in which is present (as characterized, for example, in a fiber frequency histogram) at least one mode of microfibers and at least one mode of mesofibers. (In this context, the term "bimodal" denotes possessing at least two modes, and encompasses populations that have more than two modes, for example trimodal or higher).

"Mode", when used with respect to a fiber frequency histogram or a mass frequency histogram, means a local peak whose height is equal to or larger than that for fiber diameters 1 and 2 μm smaller and 1 and 2 μm larger than the local peak.

"Fiber frequency histogram" for a fibrous web sample means a histogram in which is presented the number of fibers observed corresponding to various fiber diameters.

"Mass frequency histogram" for a fibrous web sample means a histogram in which is presented the relative mass of fibers of various diameters.

"Diameter" when used with respect to a fiber means the fiber diameter for a fiber having a circular cross section, or, in the case of a noncircular fiber, the length of the longest cross-sectional chord that may be constructed across the width of the fiber.

"Of the same polymeric composition" means polymers that have essentially the same repeating molecular unit, but which may differ in molecular weight, melt index, method of manufacture, crystalline form, commercial form, presence and amount of additives, etc.

"Of different polymeric composition" means polymers that have a significant amount of repeating molecular units that differ.

"Continuous" when used with respect to a fiber means having an essentially infinite aspect ratio (viz., a ratio of length to diameter of e.g., at least about 10,000 or more).

"Attenuating the filaments into fibers" means the conversion of a segment of a filament into a segment of greater length and smaller diameter.

"Denier" means the weight in grams of 9,000 meters of filament.

"Effective Fiber Diameter" when used with respect to a collection of fibers means the value determined according to the method set forth in Davies, C. N., "The Separation of Airborne Dust and Particles", Institution of Mechanical Engineers, London, Proceedings 1B, 1952 for a web of fibers of any cross-sectional shape be it circular or non-circular.

"Porous" means air-permeable.

"Solidity" means the percent solids in a web and is expressed as a percentage.

"Self-supporting" means a web having sufficient strength so as to be handleable by itself using reel-to-reel manufacturing equipment without substantial tearing or rupture.

"Molding" when used with respect to a web or layers of webs means to use heat and/or pressure to form the web(s) into a predetermined shape.

"Molded web" means a structure that is substantially larger in two dimensions than in a third and that has been formed into a desired shape such as a cup-shape that is adapted to fit over the nose and mouth of a person.

"Respirator" means a device that is worn by a person to filter air before the air enters the person's respiratory system.

"Mask body" means an air-permeable structure that can fit at least over the nose and mouth of a person and that helps define an interior gas space separated from an exterior gas space.

"Harness" means a structure or combination of parts that assists in supporting the mask body on a wearer's face.

"Filtration layer" means an air-permeable layer of filter media that is designed to remove contaminants from air that passes through it.

FIG. 1 shows an exemplary web 10 that comprises staple fibers 12 and meltblown fibers 14. The staple fibers 12 are distributed throughout and intermingled within the network of meltblown fibers 14. The meltblown fibers 14 comprise an intermingled mixture of microfibers 13 (defined as meltblown fibers of diameter 10 microns or less) and mesofibers 15 (defined as meltblown fibers of diameter greater than 10 microns). In one embodiment, the web comprises a bimodal mixture of intermingled microfibers and mesofibers. In various embodiments, the microfibers may exhibit a maximum diameter of about 10 µm, about 8 µm, or about 5 µm. In additional embodiments, the microfibers may exhibit a minimum diameter of about 0.1 µm, 0.5 µm, or 1 µm. In various embodiments, the mesofibers may exhibit a minimum diameter of about 11 µm, about 15 µm, or about 20 µm. In additional embodiments, the mesofibers may exhibit a maximum diameter of about 70 µm, 60 µm, or 50 µm.

The populations of microfibers and mesofibers may be characterized according to a fiber frequency histogram which presents the number of fibers of each given diameter (not including staple fibers). Alternatively, the populations may be characterized by a mass frequency histogram which presents the relative mass of the fibers (not including staple fibers) of each given fiber diameter.

The meltblown fibers 14 may be present in a bimodal fiber diameter distribution such that, (for example, as characterized with reference to a fiber frequency histogram), there is present at least one mode of microfibers and at least one mode of mesofibers. (Modes may also be present in a mass frequency histogram, and may or may not be the same as the modes present in the fiber frequency histogram). In various embodiments, a bimodal fiber mixture web may exhibit one or more microfiber modes at a fiber diameter of at least about 0.1 µm, 0.5 µm, 1 µm, or 2 µm. In additional embodiments, a bimodal fiber mixture web may exhibit one or more microfiber modes at a fiber diameter of at most about 10 µm, 8 µm, or 5 µm. In particular embodiments, a bimodal fiber mixture web may exhibit a microfiber mode of 1 µm or 2 µm. In various embodiments, a bimodal fiber mixture web may exhibit one or more mesofiber modes at a fiber diameter of at least about 11 µm, 15 µm, or 20 µm. In additional embodiments, a bimodal fiber mixture web may exhibit one or more mesofiber modes at a fiber diameter of at most about 50 µm, 40 µm, or 30 µm. Such bimodal fiber mixture webs may exhibit at least two modes whose corresponding fiber diameters differ by at least about 50%, 100%, 200%, or 400% of the smaller fiber diameter. Bimodal fiber mixture web histograms may exhibit one or more gaps between a smaller diameter meltblown fiber population and a larger diameter meltblown fiber population (as exemplified in FIGS. 9 and 10). Or, no such gap may exist.

As may be ascertained by viewing, for example, mass frequency histograms, the mesofibers may make up a significant portion of the meltblown fiber material as measured by weight, and accordingly may provide the web with strength and mechanical integrity. In one embodiment, the mesofibers comprise at least about 30% by weight of the meltblown fibers. In additional embodiments, the mesofibers comprise at least about 40%, 50%, 60%, or 70% by weight of the meltblown fibers.

As may be ascertained by viewing, for example, fiber frequency histograms, the microfibers may comprise a majority of the number of fibers in the web, and accordingly may provide the desired ability to entrap fine particles. In one embodiment, there are at least five times as many microfibers as mesofibers. In an alternative embodiment, there are at least ten times as many microfibers as mesofibers; in another embodiment, at least twenty times.

The staple fibers 12 are distributed throughout and intermingled within the network of meltblown fibers 14. In various embodiments, the web comprises at least about 30 weight %, 40 weight %, or 45% staple fibers. In additional embodiments, the web comprises at most about 70 weight %, 60 weight %, or 55 weight % staple fibers.

Staple fibers are typically added to a nonwoven web in solidified form (such as by the exemplary process described later) as opposed to being meltblown into the web. Often, they are made by processes such that the fiber diameter more closely resembles the size of the orifice through which the fiber is extruded (compared to e.g. meltblown fibers). Regardless of their process of manufacture or composition, staple fibers are typically machine cut to a specific predetermined or identifiable length. The length of the staple fibers typically is much less than that of meltblown fibers, and may be less than 0.61 meters, or less than about 0.3 meters. The staple fibers preferably would have a length of about 1 to 8 cm, more preferably about 2.5 cm to 6 cm. The average geometric fiber diameter for the staple fibers is generally greater than about 15 µm on average, and in various embodiments can be greater than 20, 30, 40, or 50 µm. The staple fibers generally have a denier of greater than about 3 g/9,000 m, and equal to or greater than about 4 g/9,000 m. At the upper limit, the denier is typically less than about 50 g/9,000 m and more commonly is less than about 20 g/9000 m to 15 g/9000 m.

The staple fibers are typically synthetic polymeric materials. Their composition may be chosen so that they can be melt-bonded to each other and/or to the meltblown fibers during a typical molding process (such as used to form a shaped respirator body). Or, they can be made of materials with properties (e.g. melting point) such that they do not bond to each other or to the meltblown fibers during a typical molding process. With respect to staple fibers used herein, the term "thermally bondable" will be generally used to designate staple fibers that have one or more components capable of some degree of melt-bonding to each other or to meltblown fibers. The term "thermally nonbondable" will be generally used to designate staple fibers that do not have any components that are capable of a significant degree of melt-bonding to each other or to the meltblown fibers used.

In certain embodiments in which the staple fiber is thermally nonbondable, the bimodal fiber mixture web may offer a superior ability to be molded (for example, into a typical cup-shaped geometry adapted to fit over the nose and mouth of a person and useful for a personal respirator), without significantly compacting the web (which might impact its filtration properties). In other embodiments in which the staple fiber is thermally bondable, greater compaction of the web may occur during a molding process. However, this type of bimodal fiber mixture web may still be suited for various filtration applications. In particular, such a web may possess an excellent ability to retain a molded configuration, thus rendering the web suitable for certain molded respirators and/or pleated filters.

Suitable staple fibers may be prepared from polyethylene terephthalate, polyester, polyethylene, polypropylene, copolyester, polyamide, or combinations of one of the foregoing. If bondable, the staple fibers typically retain much of their fiber structure after bonding. The staple fibers may be crimped fibers like the fibers described in U.S. Pat. No. 4,118,531 to Hauser. Crimped fibers may have a continuous wavy, curly, or jagged profile along their length. The staple fibers may comprise crimped fibers that comprise about 10 to 30 crimps per cm. The staple fibers may be single component fibers or multi-component fibers. Examples of commercially available single component fibers that are non-bondable at typically employed molding conditions include T-295, available from Invista Corp of Charlotte, N.C. Examples of commercially available single component thermally bondable staple fibers include T 255, T 259, and T 271, also available from Invista Corp., and Type 410 PETG, Type 110 PETG, available from Foss Manufacturing Inc., of Hampton, N.H. The staple fibers may also be multi-component fibers, where at least one of the components will soften during heating to allow the staple fibers to be bonded to each other, or to allow the staple fibers to be bonded to meltblown fibers. The different components may be different types of polymers (e.g. polyester and polypropylene), or may be the same type of polymer but with different melting points. The multi-component fibers may be bicomponent fibers that have a coextensive side-by-side configuration, a coextensive concentric sheath-core configuration, or a coextensive elliptical sheath-core configuration. Examples of bicomponent fibers that may be used as thermally bonded staple fibers include T 254, T 256, available from Invista Corp., polypropylene/polyethylene bicomponent fibers such as (Chisso ES, ESC, EAC, EKC), polypropylene/polypropylene bicomponent fiber (Chisso EPC) and polypropylene/polyethylene-terephthalate bicomponent fiber (Chisso ETC), all available from Chisso Inc. of Osaka, Japan, and Type LMF polyester 50/50 sheath/core staple fiber available from Nan Ya Plastics Corporation of Taipei, Taiwan.

Meltblown fibers are those that are prepared by a melt-blowing process, e.g. by extruding a fiber-forming material through a die orifice into a gaseous stream as described in, for example, U.S. Pat. No. 4,215,682 to Kubik et al. Typically, meltblown fibers are very long in comparison to staple fibers. Unlike staple fibers, which typically have a specific or identifiable length, meltblown fibers typically have an indeterminate length. (Although meltblown fibers have sometimes been reported to be discontinuous, the fibers generally are long and entangled sufficiently that it is usually not possible to remove one complete meltblown fiber from a mass of such fibers or to trace one meltblown fiber from beginning to end). In addition, the diameter of a solidified meltblown fiber may differ significantly from (e.g., be much smaller than) the size of a source orifice from which the molten fiber precursor was produced.

In one embodiment, the resins used to make the meltblown microfibers and mesofibers are of the same polymeric composition. In such a case, the microfibers and mesofibers may able to melt-bond to each other, either during the meltblowing process or during a subsequent molding process, depending on the particular conditions used for each process. In an alternative embodiment, the resins used to make the meltblown fibers (microfibers and mesofibers) are of different polymeric composition.

In one embodiment, the resins used to make the microfibers and mesofibers are of substantially the same melt flow index. In an alternate embodiment, the resins used to make the microfibers and mesofibers are of substantially different melt flow index.

Some examples of fiber-forming resins that may be suitable for melt-blowing include thermoplastic polymers such as polycarbonates, polyesters, polyamides, polyurethanes, block copolymers such as styrene-butadiene-styrene and styrene-isoprene-styrene block copolymers, and polyolefins such as polypropylene, polybutylene, and poly(4-methyl-1-pentene), or combination of such resins. Examples of materials that may be used to make meltblown fibers are disclosed in U.S. Pat. No. 5,706,804 to Baumann et al.; U.S. Pat. No. 4,419,993 to Peterson; U.S. Reissue Pat. No. Re. 28,102 to Mayhew; U.S. Pat. Nos. 5,472,481 and 5,411,576 to Jones et al.; and U.S. Pat. No. 5,908,598 to Rousseau et al.

For webs that will be charged, the input polymer resin may be essentially any thermoplastic fiber-forming material which will maintain satisfactory electret properties or charge separation. Preferred polymeric fiber-forming materials for chargeable webs are non-conductive resins having a volume resistivity of $10^{14}$ ohm-centimeters or greater at room temperature (22° C.). Preferably, the volume resistivity is about $10^{16}$ ohm-centimeters or greater. Polymeric fiber-forming materials for use in chargeable webs also preferably are substantially free from components such as antistatic agents that could significantly increase electrical conductivity or otherwise interfere with the fiber's ability to accept and hold electrostatic charges. Some examples of polymers which may be used in chargeable webs include thermoplastic polymers containing polyolefins such as polyethylene, polypropylene, polybutylene, poly(4-methyl-1-pentene) and cyclic olefin copolymers, and combinations of such polymers. Other polymers which may be used but which may be difficult to charge or which may lose charge rapidly include polycarbonates, block copolymers such as styrene-butadiene-styrene and styrene-isoprene-styrene block copolymers, polyesters such as polyethylene terephthalate, polyamides, polyurethanes, and other polymers that will be familiar to those skilled in the art.

Additives may be included to enhance the web's filtration performance, electret charging capability, mechanical properties, aging properties, coloration, surface properties or other characteristics of interest. For example, the polymer may contain additives to enhance filtration performance, including the additives described in U.S. Pat. Nos. 5,025,052 and 5,099,026 to Crater et al. and may also have low levels of extractable hydrocarbons to improve filtration performance (as described in, for example, U.S. Pat. No. 6,213,122 to Rousseau et al.). Fibrous webs also may be fabricated to have increased oily mist resistance as shown in U.S. Pat. No. 4,874,399 to Reed et al., and in U.S. Pat. Nos. 6,238,466 and 6,068,799, both to Rousseau et al.

Other potentially suitable additives include fillers, nucleating agents (e.g., product 3988 dibenzylidene sorbitol, available under the trademark MILLAD from Milliken Chemical), electret charging enhancement additives (e.g., tristearyl melamine, and various light stabilizers such as products 119 and 944 available under the trademark CHIMASSORB from Ciba Specialty Chemicals), cure initiators, stiffening agents (e.g., poly(4-methyl-1-pentene)), surface active agents and surface treatments (e.g., fluorine atom treatments to improve filtration performance in an oily mist environment, as described in U.S. Pat. Nos. 6,398,847 B1, 6,397,458 B1, and 6,409,806 B1 to Jones et al.).

The types and amounts of various additives to be used will be familiar to those skilled in the art. For example, electret charging enhancement additives are generally present in an amount less than about 5 wt. % and more typically less than about 2 wt. %.

Figure 2:
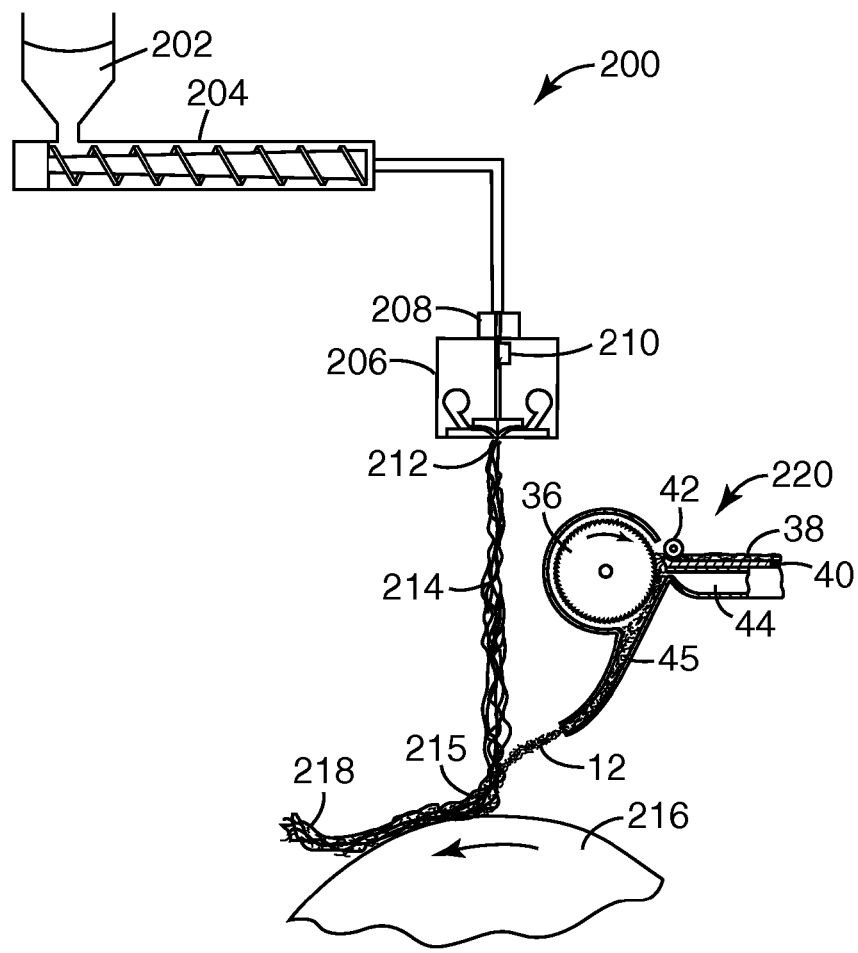
FIG. 2 is a schematic view of a first exemplary process for making a web comprising meltblown fibers and staple fibers.

FIG. 2 shows an exemplary arrangement of an apparatus 200 that can be used to produce a web comprising meltblown fibers of various diameters, including for example a bimodal fiber mixture web. Molten fiber-forming polymeric material fed from hopper 202 and extruder 204 enters meltblowing die 206 via inlet 208, flows through die cavity 210, and exits die cavity 210 through a row (discussed below in connection with FIG. 3) of larger and smaller size orifices arranged in line across the forward end of die cavity 210 and in fluid communication with die cavity 210 (in one embodiment, die cavity 210 is in fluid communication with the orifices by means of a conduit or conduits, not shown in FIG. 2). The molten fiber-forming material is thus extruded from the orifices so as to form filaments 212. A set of openings is provided through which a gas, typically heated air, is forced at very high velocity, so as attenuate the filaments 212 into fibers, which form air-borne stream 214 of meltblown fibers. In a particular embodiment, the above-described apparatus comprises a single extruder, a single die, and a single die cavity.

Figure 3:
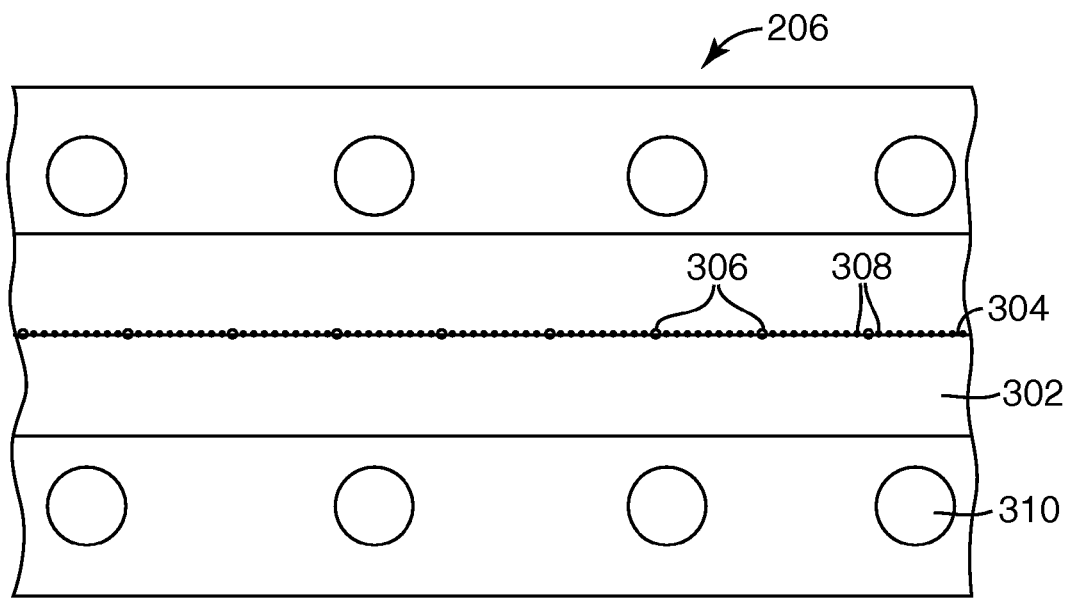
FIG. 3 is an outlet end perspective view of an exemplary meltblowing die having a plurality of larger and smaller orifices.

FIG. 3 is a close-up end perspective view of exemplary meltblowing die 206, with the attenuating gas deflector plates removed. In one embodiment, die 206 includes a projecting tip portion 302 with a row 304 of larger orifices 306 and smaller orifices 308 which define a plurality of flow passages through which molten fiber-forming material exits die 206 and forms the filaments 212. The larger orifices 306 and smaller orifices 308 can be circular, but may also comprise other shapes. Holes 310 receive through-bolts (not shown in FIG. 3) which hold the various parts of the die together. In the embodiment shown in FIG. 3, the larger orifices 306 and smaller orifices 308 have a 2:1 size ratio and there are 9 smaller orifices 308 for each larger orifice 306. Other ratios of larger:smaller orifice sizes may be used, for example ratios of 1.5:1 or more, 2:1 or more, 2.5:1 or more, 3:1 or more, or 3.5:1 or more. Other ratios of the number of smaller orifices per larger orifice may also be used, for example ratios of 5:1 or more, 6:1 or more, 10:1 or more, 12:1 or more, 15:1 or more, 20:1 or more or 30:1 or more. In various embodiments, the diameter of the smaller orifices (or largest dimension, if non-circular orifices are used) can range from at least about 0.2 mm, to at least about 0.4 mm, or at least about 0.5 mm. The number of smaller and larger orifices, and their dimension, may be chosen so as to provide that the nominal ratio of volumetric flow of molten extrudate from the larger orifices to that from the smaller orifices, can range from about 70:30, 60:40, 50:50, 40:60, to 30:70. However, the exact ratio of the volumetric flow out of the various size orifices will be influenced by the viscosity of the polymer resin and the operating conditions employed in the extrusion process. Thus, as will be appreciated based on this disclosure, operating conditions such as polymer flow rates, extruder and/or die operating temperatures, attenuating airflow rates, etc., may be chosen (and staple fibers introduced via apparatus 220 as described below), all in combination such that the thus-formed nonwoven web has the desired structure and physical properties. In this manner, the apparatus shown in FIGS. 2 and 3 may be operated so as to provide a stream comprising larger diameter fibers issuing from larger size orifices and smaller diameter fibers issuing from smaller size orifices, and thereby produce, for example, a nonwoven web comprising a bimodal fiber diameter distribution.

Figure 4:
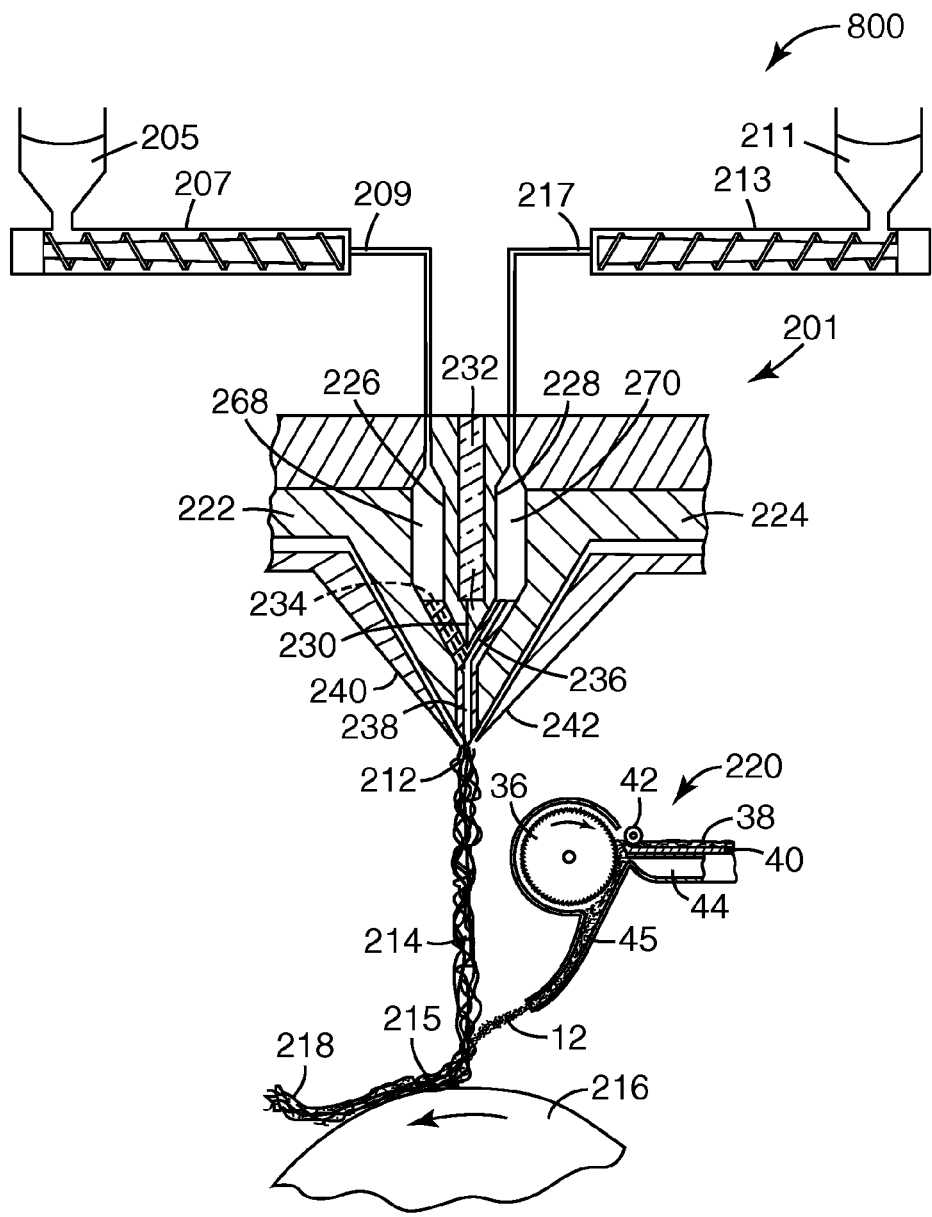
FIG. 4 is a schematic view of a second exemplary process for making a web comprising meltblown fibers and staple fibers.

FIG. 4 shows an exemplary arrangement of a second apparatus 800 that can be used to produce a web comprising meltblown fibers of various diameters, including for example a bimodal fiber mixture web. Single meltblowing die 201 is supplied with a first molten fiber-forming material fed from hopper 205, extruder 207 and conduit 209. Die 201 is separately supplied with a second molten fiber-forming material fed from hopper 211, extruder 213 and conduit 217. The conduits 209 and 217 are in respective fluid communication with first and second die cavities 268 and 270 located in first and second generally symmetrical parts 222 and 224 which form outer walls for die cavities 268 and 270. First and second generally symmetrical parts 226 and 228 form inner walls for die cavities 268 and 270 and meet at seam 230. Parts 226 and 228 may be separated along most of their length by insulation 232. Deflector plates 240 and 242 direct streams of attenuating fluid (e.g., heated air) so that they converge on the filaments 212 issuing from meltblowing die 201 and attenuate the filaments 212 into fibers 214.

Figure 5:
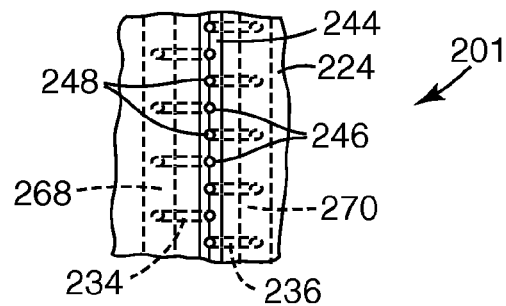
FIG. 5 is an outlet end perspective view of an exemplary meltblowing die having a plurality of orifices

FIG. 5 is a close-up end perspective view of exemplary meltblowing die 201, with the attenuating gas deflector plates 240 and 242 removed. Parts 222 and 224 meet along seam 244 in which is located a first set of orifices 246 and a second set of orifices 248 and through which the filaments 212 will emerge. In one embodiment, the orifices in set 246 and those in set 248 are of the same size (e.g. diameter, in the case of circular orifices). In an alternative embodiment, the orifices in set 246 and those in set 248 are of a different size. Die cavities 268 and 270 are in respective fluid communication via passages 234, 236 and 238 with first set of orifices 246 and second set of orifices 248. In the exemplary embodiment shown in FIG. 5, the orifices 246 and 248 are arranged in alternating order in a single row across the outlet end of die 201, and in respective fluid communication in a 50:50 ratio with the die cavities 268 and 270. Other arrangements of the orifices and other ratios of the numbers of orifices 246 and 248 may be employed. For example, the orifices may be arranged in a plurality of rows (e.g., 2, 3, 4 or more rows) between the attenuating air outlets. Patterns other than rows may be employed if desired, e.g., randomly-located orifices. If arranged in a plurality of rows, each row may contain orifices from only one set or from both the first and second sets. The number of orifices in the first and second set may stand in a variety of ratios, including 50:50, less than 50:50 (e.g. 10:90, 20:80, 30:70, 40:60, etc.), and greater than 50:50 (e.g. 60:40, 70:30, 80:20, 90:10 etc.). When orifices from both the first and second set are arranged in a row or rows, the first and second set orifices need not alternate and instead may be arranged in any desired fashion, e.g., 1221, 1122211, 11112221111 and other arrangements depending on the desired web structure. The die tip may contain more than one set of orifices, e.g., first, second, third and if need be, additional sets of orifices in respective fluid communication with first, second, third and if need be, additional die cavities within the meltblowing die, and fed by first, second, third, and if need be, additional extruders.

The apparatus shown in FIGS. 4 and 5 may be operated so as to provide a stream comprising larger size fibers issuing from one die cavity/orifice set and smaller size fibers issuing from the other die cavity/orifice set, thereby producing, for example, a nonwoven web comprising a bimodal meltblown fiber diameter distribution. This may be done in one embodiment by operating the apparatus under conditions such that the molten fiber-forming material issuing from one orifice set comprises a different viscosity than the molten fiber-forming material issuing from the other orifice set. In a specific embodiment the first fiber-forming material flows through the first set of orifices while at a substantially lower viscosity so as to form smaller diameter filaments, and the second fiber-forming material flows through the second set of orifices while at a substantially higher viscosity so as to form larger diameter filaments. (In this context, substantially higher/lower may mean, e.g., differing by at least about 20%). Such a difference in viscosity between extrudate issuing from the two orifice sets may be achieved by a variety of methods. For example, the first fiber-forming material may flow through the first set of orifices at a substantially higher temperature, and the second fiber-forming material may flow through the second set of orifices at a substantially lower temperature. (In this context, substantially higher may mean, e.g., differing by at least about 10° C.) This may be achieved, for example, by the use of a higher barrel temperature in one extruder and a lower barrel temperature in the other, and/or, the use of a higher conduit temperature in one extruder and a lower conduit temperature in the other, and/or, the use of a higher die cavity temperature for one die cavity and a lower die cavity temperature for the other die cavity (if the die cavity temperatures can be independently controlled). Thus, in one exemplary embodiment, polymer resin is supplied from extruder 207 to die cavity 268 and from extruder 213 to die cavity 270, with extruder 213 being held at a lower barrel temperature than extruder 207, such that relatively larger diameter fibers are produced from orifice set 248 and relatively smaller diameter fibers are produced from orifice set 246. In this embodiment, the two fiber forming materials may be of substantially the same melt flow index.

In another embodiment, polymer resins of substantially different melt flow index are supplied to the two orifice sets so as to achieve the desired differential in viscosity. (In this case, it may not be necessary to have the two extruders, conduits, and/or die cavities at different temperatures; however, this may also be done if desired). Thus, in one exemplary embodiment, a polymer resin of substantially higher melt flow index (i.e. lower melt viscosity) may be supplied from extruder 207 to die cavity 268, and a polymer resin of substantially lower melt flow index may be supplied from extruder 213 to die cavity 270, so as to produce relatively larger diameter fibers from orifice set 248 and relatively smaller diameter fibers from orifice set 246. (In this context, substantially different and substantially higher/lower may mean, e.g., differing by at least about 20%).

In another embodiment, apparatus 800 may be designed and/or operated such that a first molten fiber-forming material flows through a first set of orifices with the linear velocity of the molten material through each orifice (that is, the volumetric flowrate through the orifice divided by the orifice area) being relatively lower, so as to form smaller diameter filaments. And, a second molten fiber-forming material flows through a second set of orifices, the linear flowrate of this molten material through each of these orifices being relatively higher, so as to form larger diameter filaments. (In this context, relatively higher/lower may mean, e.g., differing by at least about 20%).

In one embodiment, this may be achieved by supplying the first molten resin to the first die cavity and orifice set at a lower volumetric flowrate from a first extruder, and supplying the second molten resin to the second die cavity and orifice set at a higher volumetric flowrate from a second extruder. In one embodiment, polymer resins are supplied from extruder 207 to die cavity 268 and from extruder 213 to die cavity 270, with extruder 213 providing a greater polymer flow rate than extruder 207, so as to produce relatively larger diameter fibers from orifices 248, and relatively smaller diameter fibers from orifices 246. Such a difference in volumetric output between the two extruders may be achieved by a variety of methods known in the art.

In certain embodiments, particularly those in which there is a difference in the number of orifices in each orifice set, or in the size of the orifices of the two sets, the extruder output would be adjusted accordingly. In some cases, an extruder operating at a lower volumetric flowrate may produce the larger diameter fibers, with the extruder operating at a higher volumetric flowrate producing smaller diameter fibers.

Any or all of the above parameter values (resin melt flow index and/or choice of extruder operating conditions, including but not limited to extruder volumetric output, extruder barrel temperature, extruder conduit temperature, and/or die cavity temperature) may be selected alone or in combination with other parameters so as to produce a meltblown fiber web with desired properties. Those skilled in the art of extrusion will recognize based on this disclosure than numerous approaches may be employed. Any or all of these parameter choices, separately or in combination, may also be combined with the choice of die orifice size and configuration so as to produce a meltblown fiber web with desired properties.

It is also contemplated that the die orifice designs described with respect to FIGS. 2 and 3, and the methods described with respect to FIGS. 4 and 5, may be combined. That is, resins may be separately fed (e.g. by means of separate extruders) to orifice sets (e.g. in the same die) that are different in size. Or, resins may be separately fed to separate orifice sets, one or both of the orifice sets comprising orifices of a plurality of sizes.

The various orifice design parameters discussed above, and the extrusion operating parameters discussed above, may be chosen so as to provide that the nominal ratio of volumetric flow of molten extrudate from the larger orifices to that from the smaller orifices, can range from about 90:10, 80:20, 70:30, 60:40, 50:50, 40:60, 30:70, 20:80, to about 10:90, for example. However, these same parameters affect the diameter of the thus-formed fibers, as explained above. Thus, one of skill in the art will appreciate based on this disclosure that careful selection of the various parameters is required in order to achieve the dual goals of producing fibers of different diameters and producing a desired relative population of the fibers of those different diameters.

The composition of each resin that is supplied each orifice set can be chosen as desired (separately from and without regard to whether the resins comprise substantially the same melt flow index). In one embodiment, the resins are of the same polymeric composition; that is, they have essentially the same repeating molecular unit, but they may differ in molecular weight, melt index, method of manufacture, crystalline form, commercial form, presence and amount of additives, etc. Using resins of the same polymeric composition may, for example, provide for enhanced ability of the larger and smaller fibers to bond to one another during the melt-blowing process and/or during a subsequent molding process. In another embodiment, the resins are of different polymeric composition; that is, they have a significant amount of repeating molecular units that differ (for example, polyethylene and polypropylene would be of different polymeric composition). Using resins of a different polymeric composition may, for example, allow certain properties of the larger and smaller fibers to be individually chosen for a given application. Of course, regardless of whether the resins are of the same or different polymeric composition, the amount and type of additives (such as charging additives, and the like) may be chosen as desired for the larger and smaller fibers, to fit the needs of a given application.

Staple fibers 12 may be introduced into the stream of meltblown fibers 214 through the use of exemplary apparatus 220 shown in FIG. 2 and FIG. 4. Such an apparatus provides a lickerin roll 36 which is disposed near the melt-blowing apparatus. A collection 38 of staple fibers (typically a loose, nonwoven web such as prepared on a garnet machine or "Rando-Webber"), is propelled along a table 40 under a drive roll 42 where the leading edge engages against the lickerin roll 36. The lickerin roll 36 turns in the direction of the arrow and picks off fibers from the leading edge of the web 38, separating the fibers from one another. The picked fibers are conveyed in an air stream through an included trough or duct 45 and into the stream 214 of meltblown fibers where they become mixed with the meltblown fibers. The air stream may be generated inherently by rotation of the lickerin roll, or the air stream may be augmented by use of an auxiliary fan or blower operating through a duct 44.

The mixed intermingled stream 215 of staple fibers and mesofibers and micro fibers then continues to collector 216 where the fibers form a self-supporting web, e.g. a bimodal fiber mixture web 218 of randomly intermixed and intermingled fibers comprising staple fibers, microfibers, and mesofibers. The collector 216 typically is a finely perforated screen, which may comprise a closed-loop belt, a flat screen or a drum or cylinder. The collector also can have a generally cylindrical forming surface that rotates about an axis and moves in the direction of the axis such that a selected point on the collector moves in a helical pattern (as described in U.S. Pat. No. 6,139,308 to Berrigan et al). A gas-withdrawal apparatus may be positioned behind the screen to assist in depositing the fibers and removing the gas. The resulting web 218 may be peeled off the collector and wound into a storage roll and may be subsequently processed in cutting, handling, or molding operations.

The various fiber populations in such a web are typically uniformly intermingled; that is, the meltblown fibers of various fiber diameters, as well as the staple fibers, are distributed uniformly throughout the length and breadth of the web. Typically, the various fiber populations will also be present uniformly through the thickness of the web. However, multilayer webs can be produced that have different fiber populations in different layers of the multilayer web. Such multilayer products can be formed either by passing an initially-formed web under a second web-forming apparatus of the type illustrated in FIG. 2 or FIG. 4, or by having a second web-deposition station disposed along the length of a collecting belt. Alternatively, an initially formed web can be temporarily rolled up and then passed through the same (or a different) web-forming apparatus for deposition of an additional layer. Or, two separately formed webs can be layered, laminated, etc., so as to form a multilayer structure. By any of these methods, multilayer bimodal fiber mixture webs can be formed in which the different layers of the multilayer web possess differing populations of meltblown fibers, and/or staple fibers.

If desired, electric charge can be imparted to the disclosed nonwoven webs in a variety of ways. This may be carried out, for example, by contacting the web with water as disclosed in U.S. Pat. No. 5,496,507 to Angadjivand et al., corona-treating as disclosed in U.S. Pat. No. 4,588,537 to Klasse et al., hydrocharging as disclosed, for example, in U.S. Pat. No. 5,908,598 to Rousseau et al., plasma treating as disclosed in U.S. Pat. No. 6,562,112 B2 to Jones et al. and U.S. Patent Application Publication No. US2003/0134515 A1 to David et al., or combinations thereof.

Bimodal fiber mixture webs can possess a number of advantageous properties due to their intermingled combination of staple fibers, mesofibers, and microfibers.

In various embodiments, the thickness of a bimodal fiber mixture web may be at least about 1 mm, 4 mm, or 8 mm. In additional embodiments, the maximum thickness of a bimodal fiber mixture web may be about 30 mm, 25 mm, or 20 mm. In various embodiments, the solidity of a bimodal fiber mixture web may be at least about 1.0%, 1.5%, 2.0%, or 2.5%. In additional embodiments, the solidity of a bimodal fiber mixture web may be at most about 8.0%, 6.0%, or 4.0%. In various embodiments, the bimodal fiber mixture web may exhibit an Effective Fiber Diameter of at least about 3 μm, 7 μm, or 11 μm. In additional embodiments, the bimodal fiber mixture web may exhibit an Effective Fiber Diameter of at most about 50 μm, 40 μm, or 30 μm. In various embodiments, a bimodal mixture web may have a basis weight of at least about 30 grams/m$^2$, 80 grams/m$^2$, or 100 grams/m$^2$. In additional embodiments, a bimodal mixture web may have a basis weight of at most about 300 grams/m$^2$, 250 grams/m$^2$, or 200 grams/m$^2$. In various embodiments, a bimodal fiber mixture web may exhibit a pressure drop (when a gaseous stream of 32 liters per minute is passed through a test web of approximately 101 cm$^2$ area) of less than 4 mm H$_2$0, 2 mm H$_2$0, or 0.5 mm H$_2$0.

Bimodal fiber mixture web 218 may be incorporated into any of several types of filtration devices, via any number of suitable methods. In one embodiment, web 218 may be used as a flat web in the form as made in the process described above. For instance, a piece of web 218 may be die cut and placed into a canister or holder. Alternatively, web 218 may be used as a filtration layer in a fold-flat mask type of respirator, e.g., a respirator that is packed flat but is formed with seams, pleats and/or folds that allow the respirator to be opened into a cup-shaped configuration. In an alternative embodiment, web 218 may be shaped (e.g. molded) into a non-planar shape, e.g. a pleated filter.

Figure 6:
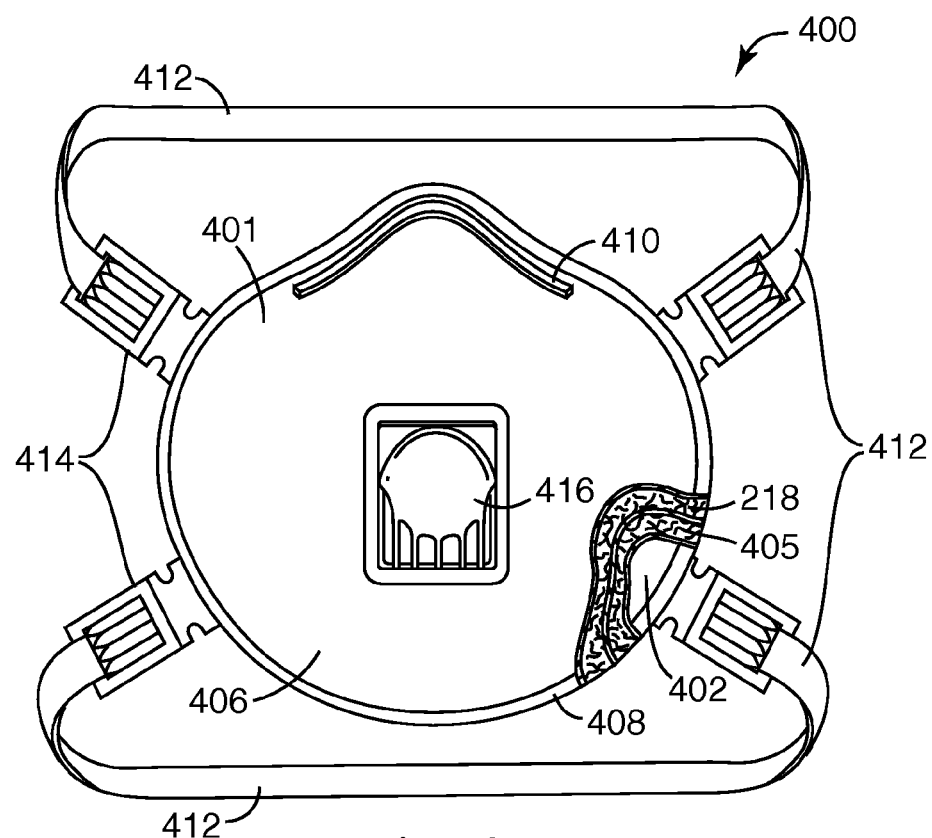
FIG. 6 is a perspective view, partially in section, of an exemplary disposable personal respirator comprising a bimodal fiber mixture web.

In one embodiment, web 218 may be shaped (e.g. molded) into a shape that is adapted to fit over the nose and mouth of a person, for example a so-called cup shape. FIG. 6 shows in partial cross-section an exemplary cup-shaped disposable personal respirator 400. Respirator 400 comprises a mask body 401 that comprises a bimodal fiber mixture web filtration layer 218, and may include inner layer 402 and/or outer layer 406. Optional welded edge 408 holds these layers together and provides a face seal region to reduce leakage past the edge of respirator 400. Leakage may be further reduced by optional pliable dead-soft nose band 410 of for example a metal such as aluminum or a plastic such as polypropylene. Respirator 400 also includes a harness 412 (e.g. comprising adjustable head and neck straps 412 fastened using tabs 414), and can optionally include exhalation valve 416.

Optionally, one or both inner and outer layers 402 and 406 may be provided and may serve a number of functions. In one embodiment, one or both layers may serve in a purely aesthetic role. In another embodiment the inner layer can be chosen so as to provide improved comfort to the wearer, using methods and materials described in U.S. Pat. No. 6,041,782 to Angadjivand et al. In addition to or instead of these uses, the inner and/or outer layers may serve as shaping layers to provide the desired molded shape of the respirator, and/or support for the filtration layer 218. Such a shaping layer can be made, for example, from a nonwoven web of thermally-bondable fibers, molded into a cup-shaped configuration, as described in for example U.S. Pat. No. 4,807,619 to Dyrud et al. and U.S. Pat. No. 4,536,440 to Berg. Such a shaping layer can also be made from a porous layer or an open work "fishnet" type network of flexible plastic, like the shaping layer disclosed in U.S. Pat. No. 4,850,347 to Skov. The shaping layer can be molded in accordance with known procedures such as those described in U.S. Pat. No. 4,850,347 or in U.S. Pat. No. 5,307,796 to Kronzer et al. Although such shaping layers may be provided for the primary purpose of providing structure and/or support for filtration layer 218, the shaping layer(s) may also may act as a filter, for example, as a coarse prefilter for larger particles.

A shaping layer may contain fibers that have bonding components which allow the fibers to be bonded to one another at points of fiber contact. Such bonding components allow adjacent-contacting fibers to coalesce when subjected to heat and cooled. Such thermally bonding fibers may come in, e.g., monofilament and bicomponent form.

Suitable fibers useful for forming shaping layers, as well as general methods of forming shaping layers, are found in U.S. Pat. No. 4,807,619 to Dyrud et al., U.S. Pat. No. 4,536,440 to Berg, and U.S. Pat. No. 6,041,782 to Angadjivand et al.

In addition to bimodal fiber mixture filtration layer 218 and optional cover layers 402 and 406, another filtration layer or layers may optionally be present. Thus, in FIG. 6 is pictured optional secondary filtration layer 405. Filtration layer 405 may consist of any filtration layer, media, or membrane, chosen as desired. In one embodiment, filtration layer 405 comprises a layer of meltblown fiber. In comparison to filtration layer 218, which as discussed above may be relatively thick, filtration layer 405 may be thinner, e.g. 1-3 mm. It also may have a different Effective Fiber Diameter than the bimodal fiber mixture web with which it is paired. In certain embodiments, filtration layer 405 and bimodal fiber mixture filtration layer 218 can be chosen to serve in a complementary fashion, i.e. so that each has properties that augment the performance of the other. If so chosen, the combination of layers 405 and 218 can provide significant advantages. For example, layer 405 may provide excellent filtration properties (in terms of preventing passage of particles), but may be susceptible to plugging. Layer 218, on the other hand, may possess a high loading capacity. Accordingly, layer 218 may be placed between a particle-containing gas stream and layer 405 (i.e. on the convex side of a typical cup shaped respirator), so as to entrap the majority of particles such that layer 405 is not plugged. Thus, the combination of two such layers may provide significantly superior performance versus that of either layer used alone. In one embodiment, filter layer 405 comprises a meltblown fiber filter layer of the type described in U.S. Pat. No. 6,932,182 to Angadjivand et al. In various embodiments, filter layer 405 can have an Effective Fiber Diameter of at least 1 µm, 3 µm, or 5 µm. In additional embodiments, filter layer 405 can have an Effective Fiber Diameter of at most 20 µm, 10 µm, or 6 µm.

If a secondary filtration layer 405 is desired, it can be manufactured separately from layer 218 and introduced into the respirator during the molding process in which the respirator is made, as described later. Or, it can be made separately and laminated to filtration layer 218 to form a multilayer laminate which is then subjected to the respirator molding process. Layers 218 and 405 may be charged for optimal filtration performance, according to methods described previously. Such charging may be performed on each layer separately; or, the webs may be combined (e.g. laminated) and charged in a single process. In one embodiment, filter layer 405 is charged separately according to the process described in U.S. Pat. No. 5,496,507 to Angadjivand et al.

Other layers and/or additives may also be included; for example, one or more layers may contain sorbent particles that may be employed to capture vapors of interest, such as the porous layers described in U.S. patent application Ser. No. 11/431,152 filed May 8, 2006 and entitled PARTICLE-CONTAINING FIBROUS WEB. Other layers may be included for various reasons (for example, aesthetic, decorative, mechanical support or stiffness).

In one embodiment, a personal respirator 400 can be made from bimodal fiber mixture web 218 via the following process. Bimodal fiber mixture web 218, and optional filtration layer 405, are charged by the process described previously, and are then placed in stacked relation. (The charging process may be performed on each web separately, after which the webs are brought together; alternatively, the webs may be brought together, e.g., laminated, and charged as a unit). Either or both of the optional cover layer webs 402 and 406 can then be placed in stacked relation to web 218 (or to the combination of webs 218 and 405).

The stack of filtration layer(s) and cover layer(s) is then placed into a molding apparatus that has cup-shaped male and female molding surfaces (which are typically heated). The molding surfaces are then brought together for sufficient time and/or at sufficient pressure so as to form the multilayer stack into a cup-shaped mask body (which typically has a convex and a concave side). Excess material can then be cut from around the molded piece, after which straps, harnesses, valves, etc., can be added as desired to form the finished respirator.

The molding process typically imparts some degree of permanent shaping to the filtration layer 218, along with optional secondary filtration layer(s) and optional shaping layers. The molding process may also impart some amount of melt-bonding between the various individual fibers at the points of contact between the fibers, and may also impart some amount of melt-bonding of the various layers to each other, that is, between bimodal fiber mixture layer 218 and optional layer 405, between layer 218 and layers 402 and/or 406, and so on. If sufficient bonding between the various layers is not performed in the molding process, additional methods can be used. For example, a bonding process (such as ultrasonic welding) can be performed around the edges 408 of the respirator, or mechanical clamps or other bonding means may be used around edges 408, to ensure that the layers are held together adequately. If this is not sufficient, localized bonding treatments (e.g. spot welding, etc.) can be used in appropriate locations on the respirator, as long as the properties of the respirator are not unduly affected. It is also possible to use adhesive layers to bond the various layers together, as described in U.S. Pat. No. 6,923,182, to Angadjivand et al.

Molded respirators comprising bimodal fiber mixture webs, as described herein, can exhibit a number of useful properties, either alone or in combination with a secondary filtration layer as described herein. In various embodiments, a molded respirator comprising a bimodal fiber mixture web may exhibit a pressure drop (when a gaseous stream of 85 liters per minute is passed through a test web of approximately 159 cm$^2$ which is loaded with 70 mg salt) of less than 50 mm H$_2$0, 25 mm H$_2$0, or 20 mm H$_2$0. In additional embodiments, a molded respirator comprising a bimodal fiber mixture web may exhibit a pressure drop (when a gaseous stream of 30 liters per minute is passed through a test web of approximately 159 cm$^2$ which is loaded with 40 mg welding fumes) of less than 80 Pa, 60 Pa, or 40 Pa.

This combination of properties may make bimodal fiber mixture webs well suited for various filtration applications; for example, those in which a high amount of depth loading of particulate is obtainable without plugging the web and/or encountering unsatisfactorily high pressure drop.

The invention is further illustrated by means of the following examples.

EXAMPLES

The following test methods were used to evaluate the webs and molded filter elements:

Particulate Penetration with Sodium Chloride

Penetration and pressure drop for individual molded filter samples were determined by using an AFT Tester, Model 8130, from TSI Incorporated, St. Paul, Minn. Sodium Chloride (NaCl) at a concentration of 20 milligrams per cubic meter (mg/m3) was used as a challenge aerosol. The aerosol challenges were delivered at a face velocity of 13.8 centimeters per second (cm/sec), corresponding to 85 liters per minute flowrate. Pressure drop over the molded filter specimen (area approximately 159 cm$^2$) was measured during the penetration test and was recorded in millimeters water (mm H$_2$O). In particular, the pressure drop at 70 mg salt loading was reported.

Welding Fume Test

Molded filter samples were exposed to welding fumes using an apparatus and method as follows. A mild steel welding plate (6 mm thickness) was positioned in a collector chamber. A flux cored wire (Nittetsu SF-1; 1.2 mm diameter), was positioned adjacent the steel plate. Welding shield gas (CO$_2$) was introduced to the welding area at 13 Liters/minute flowrate. A welding voltage of 22V and a current of 170A was used to generate a fume concentration that was transported by means of a vortex blower out of the collector chamber into a fume chamber (0.8 m×1.0 m×1.3 m). The fume-containing air was then pulled from the fume chamber through a sampling system by means of a suction pump at the downstream end of the sampling system. A molded filter sample was placed into a holder box in the sampling system such that the fume-laden air passed through an area of the sample of about 159 cm$^2$. HEPA filtered dilution air was introduced into the sampling system by means of a valve located downstream of the fume chamber and upstream of the sample holder box. The suction pump was operated, and dilution air was introduced, under conditions such that the sample was challenged with fume-laden air at approximately 50 mg of fume sample per cubic meter of air, at a flowrate of 30 Liters/minute. Light scattering detectors (available from Shibata Scientific Technology Ltd. AP-632F) were positioned upstream and downstream of the sample so as to monitor the fume concentration impinging on and penetrating through the sample, respectively. Pressure drop over the molded filter specimen was measured during the penetration test and was recorded in Pascals (Pa). In particular, the pressure drop at 40 mg weld fume loading was reported.

Effective Fiber Diameter

The Effective Fiber Diameter (EFD) for web specimens were determined according to the method set forth in Davies, C. N., "The Separation of Airborne Dust and Particles", Institution of Mechanical Engineers, London, Proceedings 1B, 1952.

Pressure Drop

Web specimens were characterized as to their pressure drop when exposed to an air flow of 32 liters per minute (lpm).

Fiber Diameter Distribution

Determination of fiber (diameter) size distribution was carried out by image analysis of photomicrographs of web specimens. Web specimens were prepared by mounting a web sample on a scanning electron microscope stub and vapor-plating the fibers with approximately 100 Angstroms (Å) of gold/palladium. Plating was done using a DENTON Vacuum Desk II Cold Sputter apparatus (available from DENTON Vacuum, of Moorestown, N.J.) with a 40 milliamp sputter cathode plating source at a chamber vacuum of 50 millitorr supplied with and Argon gas flow of 125-150 millitorr. Duration of the plating process was approximately 45 seconds. The plated sample was then inserted in a LEO VP 1450 scanning electron microscope (LEO Electron Microscopy Inc, One Zeiss Drive, Thournwood, New York, N.Y. 10594) and imaged at a 0 degree tilt, 15 kilovolt (kV) acceleration voltage, and 15 mm WD (working distance). Electronic images taken at various magnifications were used to determine fiber diameters. Electronic images of the surface view of a specimen were analyzed using a personal computer running UTHSCSA (University of Texas Health Science Center in San Antonio) Image Tool for Windows version 2.00 available from the University of Texas. To perform an image analysis, the Image Tool was first calibrated to the microscope magnification and then the electronic image of a specimen processed so that individual fibers were measured across their width (diameter). A minimum of 150 meltblown fibers were measured for each web sample. Only individual fibers (no married or roping fibers) from each image were measured.

For generation of histograms, fiber diameters were rounded up to the nearest micron (e.g. a histogram value of 2 microns encompasses fibers with a measured diameter of between 1 and 2 microns). For fiber frequency histograms, for each fiber diameter the frequency (number of fibers) was reported. Mass frequency histogram data was obtained by, for each fiber diameter, multiplying the fiber frequency (number of fibers) by a factor proportional to the square of the fiber diameter. Due to the test method used, the presence and number of fibers above a particular diameter (usually 22 microns diameter, or in some cases 18 microns), was detected, but the diameter was not quantifiable. Thus, the mass frequency value reported for these fibers (i.e. those shown on the mass frequency histograms as >18 microns or >22 microns) is not to scale.

For generation of histograms, only meltblown fibers were counted. Staple fibers, which could be distinguished from meltblown fibers by their appearance (e.g. surface texture, profile, etc.), their shorter length, and/or their determinate length, were not included in histograms.

If desired, for a fiber population or nonwoven web, an average geometric fiber diameter may be determined from such fiber diameter distribution data, for example following the procedure outlined in U.S. Pat. No. 6,827,764 to Springett et al.

Example 1

Using an apparatus like that shown in FIG. 2 and FIG. 3 and procedures like those described in Wente, Van A. "Superfine Thermoplastic Fiber", Industrial and Engineering Chemistry, vol. 48. No. 8, 1956, pp 1342-1346 and Naval Research Laboratory Report 111437, Apr. 15, 1954, a meltblown fiber web was produced that contained an intermingled mixture of microfibers and mesofibers.

The meltblown fibers were formed from a 1350 melt flow polypropylene available under the designation EOD-12 from Total S.A. of Paris, France, to which had been added 1 wt. % tristearyl melamine as an electret charging additive. The polymer was fed to a Model 20 DAVIS STANDARD™ 2 in. (50.8 mm) single screw extruder from the Davis Standard Division of Crompton & Knowles Corp. The extruder had a 20/1 length/diameter ratio and a 3/1 compression ratio. A Zenith 10 cc/rev melt pump metered the flow of polymer to a 50.8 cm wide drilled orifice meltblowing die. The die, which originally contained 0.3 mm diameter orifices, had been modified by drilling out every 9th orifice to 0.6 mm, thereby providing a 9:1 ratio of the number of smaller size to larger size holes and a 2:1 ratio of larger hole size to smaller hole size. This die design served to deliver a nominal ratio of total larger-diameter fiber extrudate to total smaller-diameter fiber extrudate of approximately 60/40 by volume. (As noted previously, the exact ratio is dependent on the specific process conditions and resin used). The line of orifices had 10 holes/cm hole spacing. Heated air was used to attenuate the fibers at the die tip. The airknife was positioned at a 0.5 mm negative set back from the die tip and a 0.76 mm air gap. No to moderate vacuum was pulled through a medium mesh collector screen at the point of web formation. The polymer output rate from the extruder was about 0.18 kg/cm/hr, the DCD (die-to-collector distance) was about 74 cm, and the air pressure was adjusted as desired.

Samples of bimodal meltblown fiber webs formed in this manner (not containing staple fibers) were characterized, with various properties reported in Table 1.

A staple fiber addition unit (as previously described) was then started and web was formed comprising meltblown fibers made according to the above conditions, and also comprising staple fibers introduced into the meltblown fiber stream. The staple fibers comprised a 6 denier polyester fiber product available under the designation trade name T-295 from Invista Corp, and were introduced so as to form a bimodal fiber mixture web comprising approximately 50% by weight meltblown fibers and 50% by weight staple fibers.

The resulting bimodal fiber mixture web was hydrocharged according to the process described in U.S. Pat. No. 5,496,507 to Angadjivand et al. Hydrocharging was carried out by passing the web over a vacuum slot at a rate of 5 cm/sec while deionized water was sprayed onto the web at a hydrostatic pressure of about 620 kPa from a pair of Teejet 9501 sprayer nozzles (available from Spraying Systems Co., of Wheaton, Ill.) that were mounted about 10 cm apart and were centered about 7 cm above the vacuum slot. The web was then inverted, and the hydrocharging process was repeated to allow both sides of the web to be impinged with deionized water. Excess water was then removed by passing the web a third time over the vacuum slot. The web was then allowed to dry under ambient conditions by hanging.

Samples of bimodal fiber mixture webs formed in this manner were then characterized, with various properties reported in Table 2.

Figure 7:
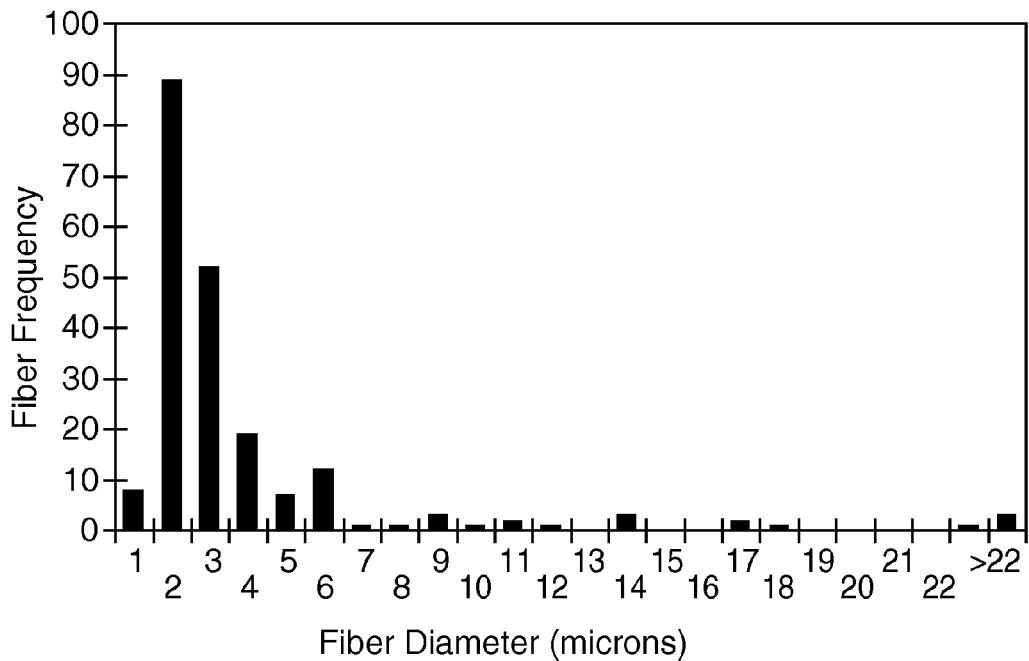
FIG. 7 is a fiber frequency histogram of the meltblown fiber population of the bimodal mixture web of Example 1.
Figure 8:
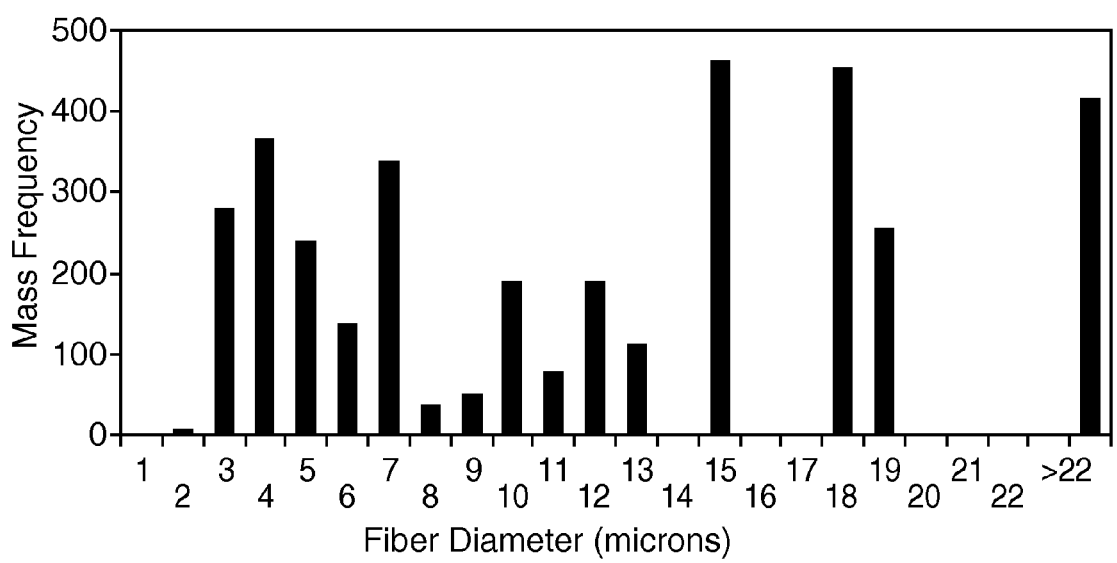
FIG. 8 is a mass frequency histogram of the meltblown fiber population of the bimodal fiber mixture web of Example 1.

Representative bimodal fiber mixture webs were also analyzed using the equipment and procedures described previously, in order to generate histogram data. FIG. 7 is a fiber frequency histogram for the meltblown fiber population of this sample. FIG. 8 is a mass frequency histogram for the same sample. With reference to the fiber frequency histogram of FIG. 7, this sample is seen to exhibit at least one microfiber mode at about 2 micron fiber diameter and at least one mesofiber mode at about 14 micron fiber diameter.

A secondary filter web was also produced and charged, according to the methods outlined in Example 1 in U.S. Pat. No. 6,923,182, with the difference that in this case the filter web had a basis weight of 25 grams per square meter. This secondary filter web was made using a die with uniform orifice diameters. The resin used was a polypropylene resin available from Total S.A. of Paris, France, under the designation 3960. Staple fiber was not present in the secondary filter web. This secondary layer thus comprised a porous meltblown nonwoven with a basis weight of approximately 25 grams/m$^2$, a solidity of approximately 8.4%, and an Effective Fiber Diameter of approximately 4.7 µm. (The secondary filter web exhibited a fiber frequency histogram similar to that shown in FIG. 15, with a microfiber mode of approximately 2 micron fiber diameter.)

Pieces of the bimodal fiber mixture web and the secondary filter web were brought together along with outer (top and bottom) shaping layers that were made according to the procedures outlined in U.S. Pat. No. 6,041,782. The shaping layers were composed of nonwoven webs of 55 g/m$^2$ basis weight that were made from 4 denier bicomponent staple fiber, available under the designation LMF from Nan Ya Plastics Corporation of Taipei, Taiwan.

Molding of the web layers to form a respirator was done by placing the layers between mating parts of a hemispherical cup-shaped heated mold that was about 55 mm in height and had a volume of about 310 cm$^3$. The top and bottom halves of the mold were heated to about 108° C. The heated mold was closed to a gap of approximately 2.5 mm for approximately 6 seconds. After this time, the mold was opened and the molded product was removed and trimmed manually. Ultrasonic bonding was then performed on the edges of the molded respirator.

The respirator was molded such that the secondary layer was toward the concave side of the respirator, relative to the bimodal fiber mixture web layer. Properties of the thus-formed respirator were tested (with the respirator being exposed to the gas stream on its convex side, such that the bimodal fiber mixture web layer was positioned upstream of the secondary layer) and are listed in Table 3.

Example 2

Using the general method of Example 1, a web was made in similar manner with the following differences: The meltblown fibers were formed from a 1475 melt flow polypropylene available under product designation 3746 from ExxonMobil Corporation of Irving, Tex. The polymer output rate from the extruder was about 0.27 kg/cm/hr, the air knife was positioned at a 0.25 mm positive setback and the DCD (die-to-collector distance) was about 33 cm. The staple fibers that were introduced into the stream of meltblown fibers comprised 4 denier bicomponent 50/50 sheath/core polyester fibers available under the designation LMF from Nan Ya Corp.

Data from a representative meltblown-fiber web sample and a bimodal fiber mixture web made under these conditions are listed in Tables 1 and 2. This web was not formed into molded respirator samples.

Figure 9:
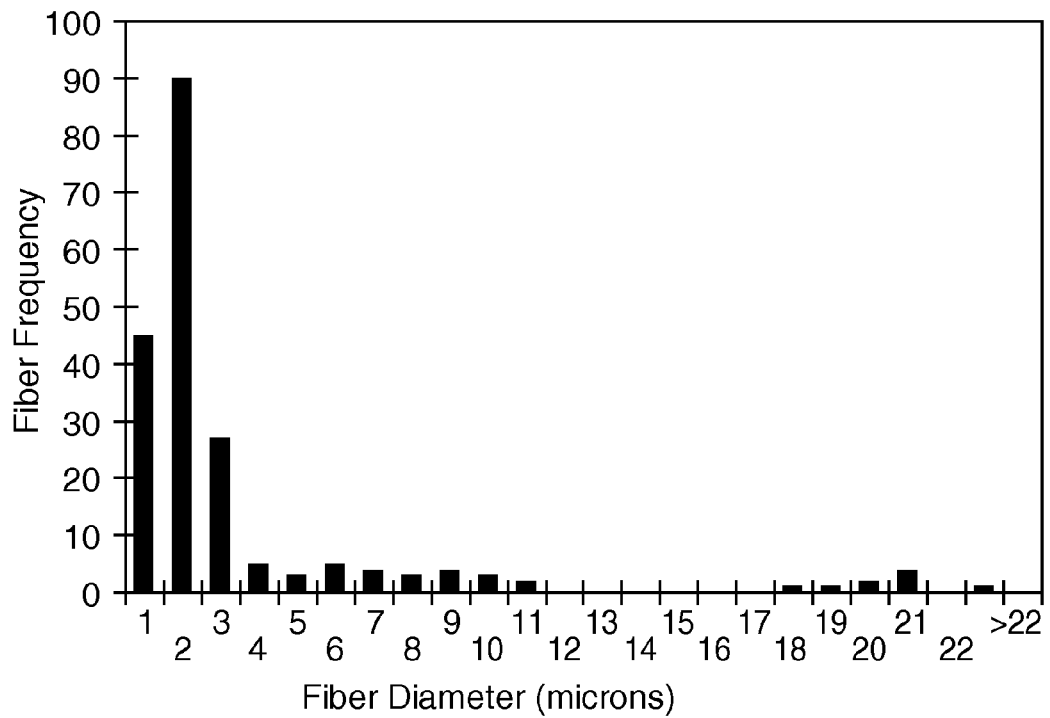
FIG. 9 is a fiber frequency histogram of the meltblown fiber population of the bimodal mixture web of Example 2.
Figure 10:
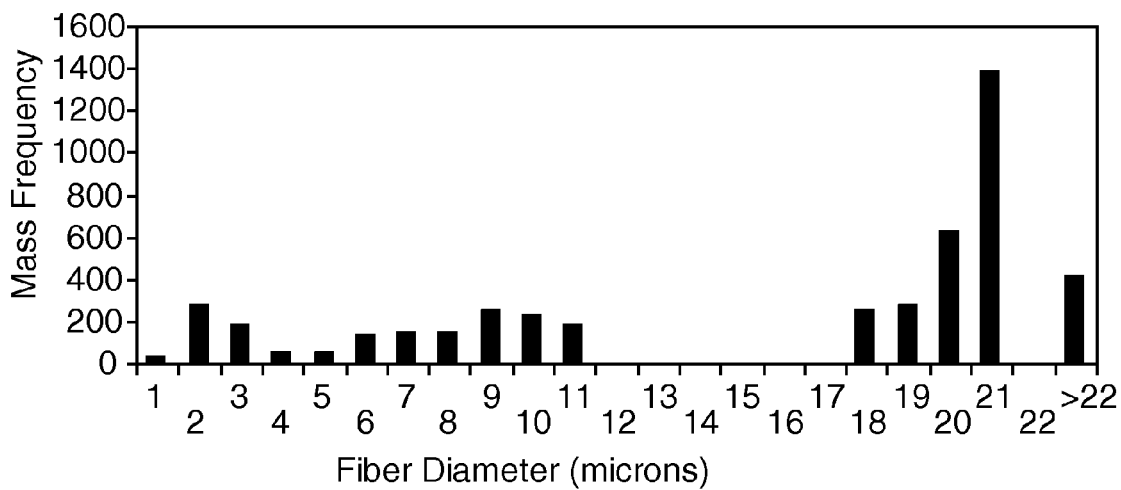
FIG. 10 is a mass frequency histogram of the meltblown fiber population of the bimodal fiber mixture web of Example 2.

Representative bimodal fiber mixture webs were also analyzed using the equipment and procedures described previously, in order to generate histogram data. FIG. 9 is a fiber frequency histogram for the meltblown fiber population of this sample. FIG. 10 is a mass frequency histogram for the same sample. With reference to the fiber frequency histogram of FIG. 9, this sample is seen to exhibit at least one microfiber mode at about 2 micron fiber diameter, and at least one mesofiber mode at about 21 micron fiber diameter.

Example 3

Using the general method of Example 1, a web was made in similar manner with the following differences: The staple fibers that were introduced into the stream of meltblown fibers comprised 4 denier bicomponent 50/50 sheath/core polyester fibers available under the designation LMF from Nan Ya Corp.

The web was formed into a molded respirator in similar manner to that of Example 1 and included outer and inner shaping layers as well as a 25 g/m² secondary filter layer.

Samples were tested in similar manner as in Example 1. Data from a representative meltblown-fiber web sample and a bimodal fiber mixture web sample made under these conditions, and a molded respirator made therefrom, are listed in Tables 1, 2 and 3.

Fiber diameter histograms were not obtained for this example.

Example 4

Using the general method of Example 1, a web was made in similar manner with the following differences: The meltblown fibers were formed from a 1475 melt flow polypropylene available under product designation 3746 from Exxon-Mobil Corporation of Irving, Tex. The air knife was positioned at a 0.25 mm positive setback. The staple fibers that were introduced into the stream of meltblown fibers comprised 4 denier bicomponent 50/50 sheath/core polyester fibers available under the designation LMF from Nan Ya Corp. The staple fibers were introduced so as to form a product web comprising approximately 70% by weight meltblown fibers and 30% by weight staple fibers.

Molding of the web layers to form a respirator was done in similar manner to that of Example 1 with a mold temperature of about 114° C., a mold gap of approximately 1.0 mm and a mold time of approximately 10 seconds. The structure included outer and inner shaping layers but did not include a secondary filter layer.

Samples were tested in similar manner as in Example 1. Data from a representative meltblown-fiber web sample and a bimodal fiber mixture web made under these conditions, and a molded respirator made therefrom, are listed in Tables 1, 2 and 3.

Figure 11:
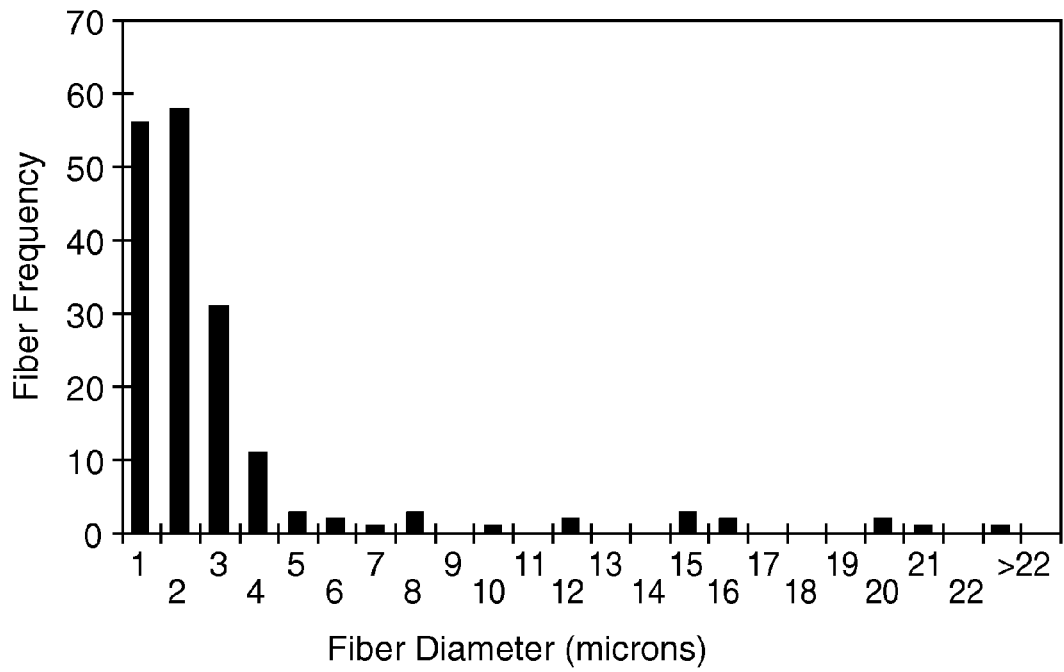
FIG. 11 is a fiber frequency histogram of the meltblown fiber population of the bimodal mixture web of Example 4.
Figure 12:
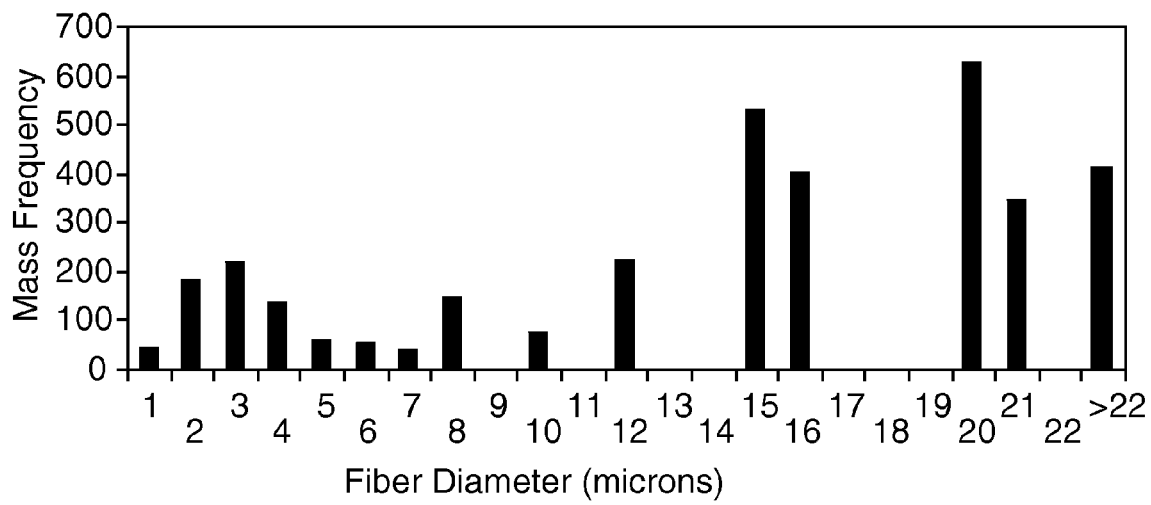
FIG. 12 is a mass frequency histogram of the meltblown fiber population of the bimodal fiber mixture web of Example 4.

Representative bimodal fiber mixture webs were also analyzed using the equipment and procedures described previously, in order to generate histogram data. FIG. 11 is a fiber frequency histogram for the meltblown fiber population of this sample. FIG. 12 is a mass frequency histogram for the same sample. With reference to the fiber frequency histogram of FIG. 11, this sample is seen to exhibit at least one microfiber mode at about 2 micron fiber diameter, and at least one mesofiber mode at about 15 micron fiber diameter.

Example 5

Using the general method of Example 1, a web was made in similar manner with the following differences: The meltblown fibers were formed from a 36 melt flow polypropylene available under product designation 3155 from ExxonMobil Corporation of Irving, Tex., the polymer output rate from the extruder was about 0.27 kg/cm/hr, the air knife was positioned at a 0.25 mm positive setback, the DCD (die-to-collector distance) was about 51 cm, and no staple fiber was used. Molding of the web layers to form a respirator was done in similar manner to that of Example 1 with a mold temperature of about 108° C., a mold gap of approximately 2.5 mm and a mold time of approximately 6 seconds. The structure included outer and inner shaping layers but did not include a secondary filter layer.

Data from a representative bimodal meltblown-fiber web sample (not containing staple fibers) made under these conditions, and a molded respirator made therefrom, are listed in Tables 1, 2 and 3.

Figure 13:
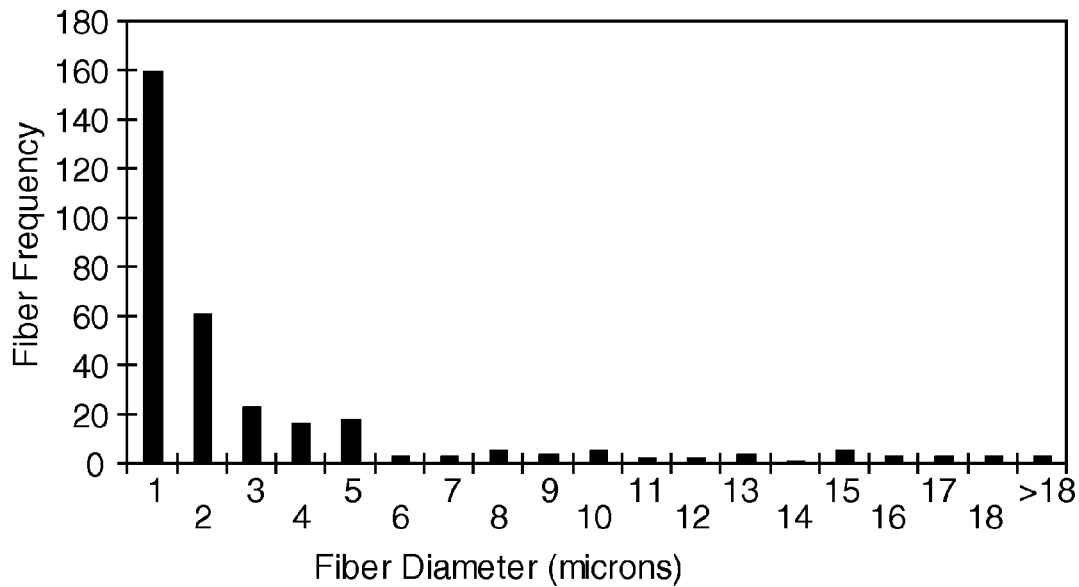
FIG. 13 is a fiber frequency histogram of the bimodal meltblown fiber population of the web of Example 5.
Figure 14:
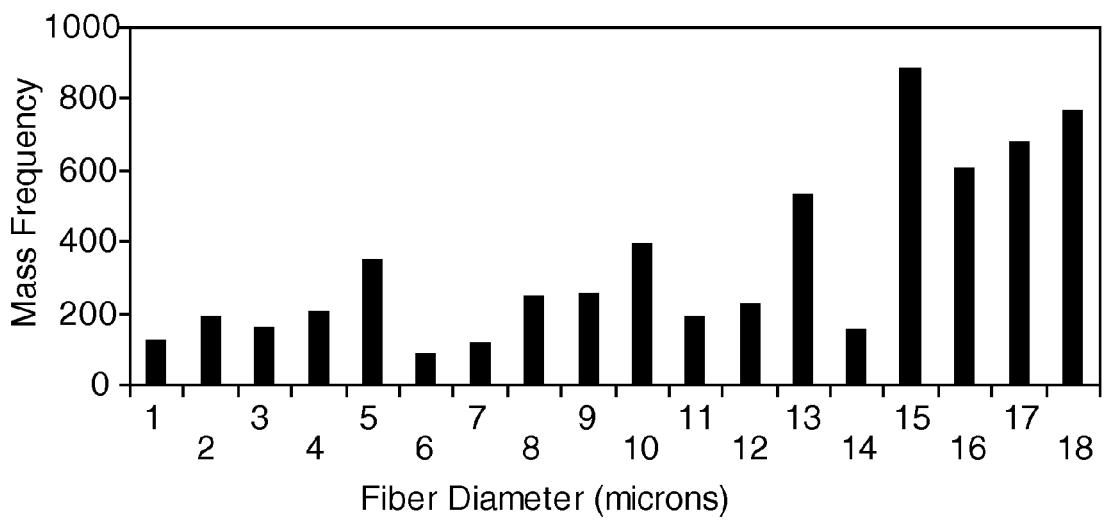
FIG. 14 is a mass frequency histogram of the bimodal meltblown fiber population of the web of Example 5.

A representative meltblown fiber web sample made as described in Example 5 was also analyzed using the equipment and procedures described previously, in order to generate histogram data. FIG. 13 is a fiber frequency histogram for the meltblown fiber population of this sample. FIG. 14 is a mass frequency histogram for the same sample. With reference to the fiber frequency histogram of FIG. 13, this sample is seen to exhibit at least one microfiber mode at about 1 micron fiber diameter, and at least one mesofiber mode at about 15 micron fiber diameter.

Example 6

A porous nonwoven meltblown fiber web was produced according to the methods outlined in Example 1 in U.S. Pat. No. 6,923,182, with the difference that in this case the filter web had a basis weight of 25 grams per square meter. The resin used was a polypropylene resin available from Total S.A. of Paris, France, under the designation 3960. The web was made using a die with uniform orifice diameters of about 0.38 mm at approximately 10 holes/cm hole spacing. Staple fiber was not present. This web thus comprised a porous meltblown nonwoven web that did not have a bimodal meltblown fiber diameter distribution.

Figure 15:
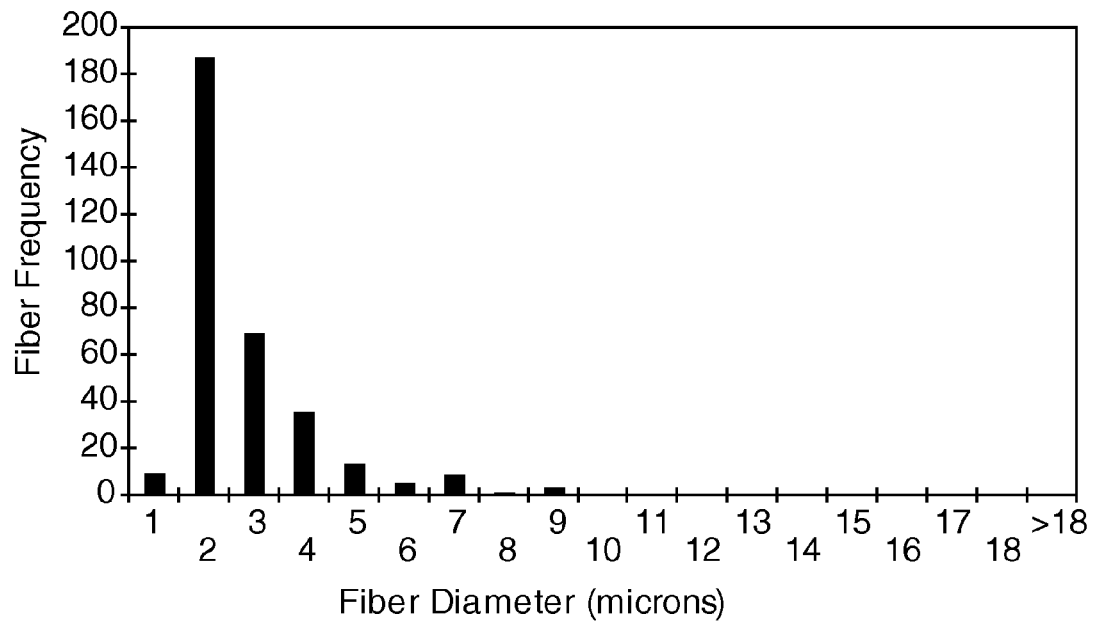
FIG. 15 is a fiber frequency histogram of the meltblown fiber web of Example 6.
Figure 16:
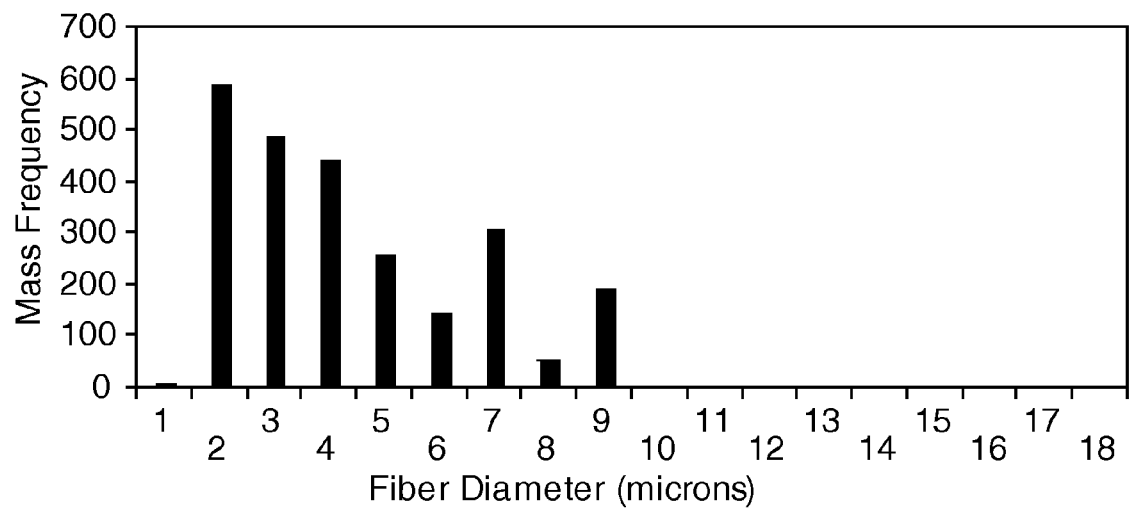
FIG. 16 is a mass frequency histogram of the meltblown fiber web of Example 6.

Representative samples from this web were analyzed using the equipment and procedures described previously, in order to generate histogram data. FIG. 15 is a fiber frequency histogram for the meltblown fiber population of this sample. FIG. 16 is a mass frequency histogram for the same sample. With reference to the fiber frequency histogram of FIG. 15, this sample is seen to exhibit at least one microfiber mode (at 2 micron fiber diameter), but does not exhibit a mesofiber mode.

Molded respirator samples were not generated from this web.

Example 7

Using an apparatus like that shown in FIG. 4 and FIG. 5 and procedures like those described in Wente, Van A. "Superfine Thermoplastic Fiber", Industrial and Engineering Chemistry, vol. 48. No. 8, 1956, pp 1342-1346 and Naval Research Laboratory Report 111437, Apr. 15, 1954, a meltblown fiber web was produced that contained an intermingled mixture of microfibers and mesofibers.

The resin used was a polypropylene resin available from Total S.A. of Paris, France, under the designation 3960, to which had been added 0.8 wt. % tristearyl melamine as an electret charging additive. The resin was fed to a Model 20 DAVIS STANDARD™ 2 in. (50.8 mm) single screw extruder from the Davis Standard Division of Crompton & Knowles Corp. The extruder had a 20/1 length/diameter ratio and a 3/1 compression ratio. The same resin was separately fed to a DAVIS STANDARD™ 1.5 in. (38 mm) single screw extruder from the Davis Standard Division of Crompton & Knowles Corp. Using 10 cc/rev ZENITH™ melt pumps from Zenith Pumps, the flow of each polymer was metered to separate die cavities in a 50.8 cm wide drilled orifice meltblowing die employing 0.38 mm diameter orifices at a spacing of 10 holes/cm with alternating orifices being fed by each die cavity. Heated air attenuated the fibers at the die tip. The airknife employed a 0.25 mm positive set back and a 0.76 mm air gap. A moderate vacuum was pulled through a medium mesh collector screen at the point of web formation. The combined polymer output rate from the extruders was 0.18 kg/cm/hr, the DCD (die-to-collector distance) was 50.8 cm and the collector speed was adjusted as needed to provide web with a basis weight of approximately 50 gsm (grams per square meter). This combination of equipment design parameters and operating conditions served to deliver a nominal ratio of total larger-diameter fiber extrudate to total smaller-diameter fiber extrudate of approximately 65/35 by volume.

Samples of bimodal meltblown fiber webs formed in this manner (not containing staple fibers) were characterized, with various properties reported in Table 1.

A staple fiber addition unit (as previously described) was then started and web was formed comprising meltblown fibers made according to the above conditions, and also comprising staple fibers introduced into the meltblown fiber stream. The staple fibers comprised a 6 denier polyester fiber product available under the designation trade name T-295 from Invista Corp, and were introduced so as to form a bimodal fiber mixture web comprising approximately 50% by weight meltblown fibers and 50% by weight staple fibers.

The resulting bimodal fiber mixture web was hydrocharged according to the process described in U.S. Pat. No. 5,496,507 to Angadjivand et al. Hydrocharging was carried out by passing the web over a vacuum slot at a rate of 5 cm/sec while deionized water was sprayed onto the web at a hydrostatic pressure of about 620 kPa from a pair of Teejet 9501 sprayer nozzles (available from Spraying Systems Co., of Wheaton, Ill.) that were mounted about 10 cm apart and were centered about 7 cm above the vacuum slot. The web was then inverted, and the hydrocharging process was repeated to allow both sides of the web to be impinged with deionized water. Excess water was then removed by passing the web a third time over the vacuum slot. The web was then allowed to dry under ambient conditions by hanging.

Samples of bimodal fiber mixture webs formed in this manner were then characterized, with various properties reported in Table 2.

Figure 17:
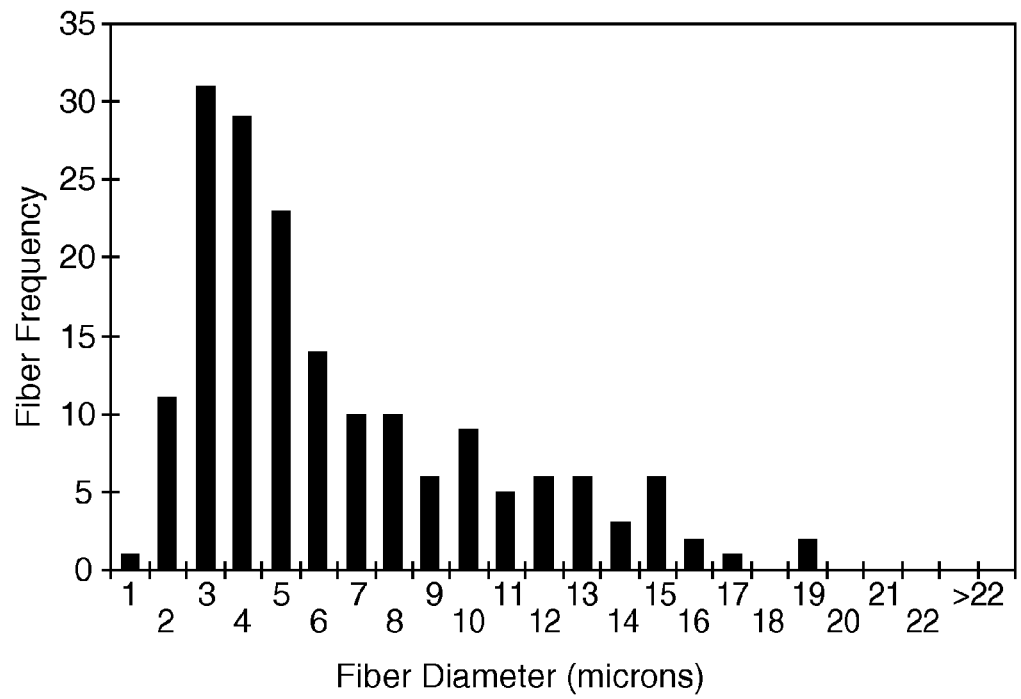
FIG. 17 is a fiber frequency histogram of the meltblown fiber population of the bimodal mixture web of Example 7.
Figure 18:
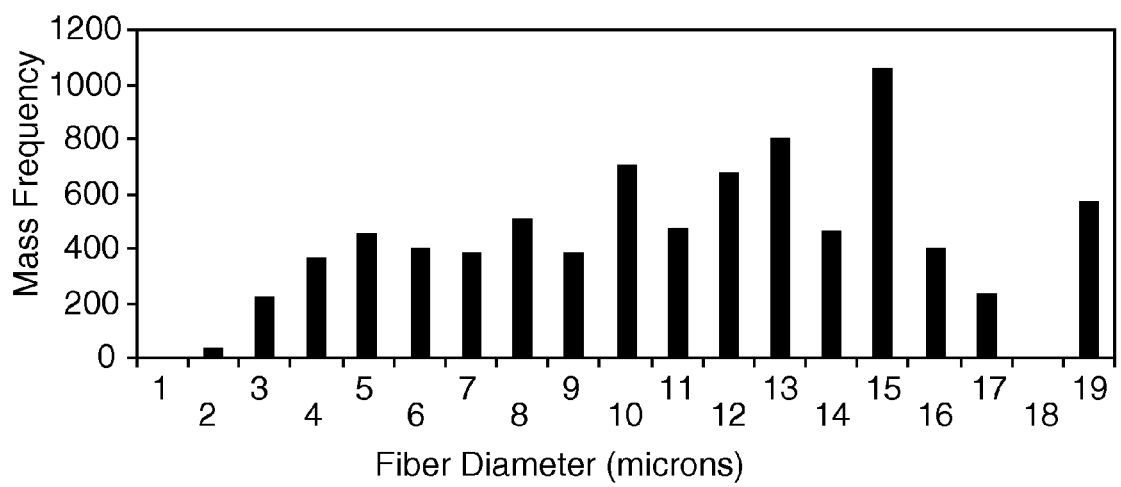
FIG. 18 is a mass frequency histogram of the meltblown fiber population of the bimodal fiber mixture web of Example 7.

Representative bimodal fiber mixture webs were also analyzed using the equipment and procedures described previously, in order to generate histogram data. FIG. 17 is a fiber frequency histogram for the meltblown fiber population of this sample. FIG. 18 is a mass frequency histogram for the same sample. With reference to the fiber frequency histogram of FIG. 17, this sample is seen to exhibit at least one microfiber mode at about 3 micron fiber diameter and at least one mesofiber mode at about 15 micron fiber diameter.

A secondary filter web was also produced and charged, according to the methods outlined in Example 1 in U.S. Pat. No. 6,923,182, with the difference that in this case the filter web had a basis weight of 25 grams per square meter. This secondary filter web was made using a die with uniform orifice diameters. The resin used was a polypropylene resin available from Total S.A. of Paris, France, under the designation 3960. Staple fiber was not present in the secondary filter web. This secondary layer thus comprised a porous meltblown nonwoven with a basis weight of approximately 25 grams/m$^2$, a solidity of approximately 8.4%, and an Effective Fiber Diameter of approximately 4.7 µm. (The secondary filter web exhibited a fiber frequency histogram similar to that shown in FIG. 15, with a microfiber mode of approximately 2 micron fiber diameter.)

Pieces of the bimodal fiber mixture web and the secondary filter web were brought together along with outer (top and bottom shaping) layers that were made according to the procedures outlined in U.S. Pat. No. 6,041,782. The shaping layers were composed of nonwoven webs of 55 g/m$^2$ basis weight that were made from 4 denier bicomponent staple fiber, available under the designation LMF from Nan Ya Plastics Corporation of Taipei, Taiwan.

Molding of the web layers to form a respirator was done by placing the layers between mating parts of a hemispherical cup-shaped heated mold that was about 55 mm in height and had a volume of about 310 cm$^3$. The top and bottom halves of the mold were heated to about 108° C. The heated mold was closed to a gap of approximately 2.5 mm for approximately 6 seconds. After this time, the mold was opened and the molded product was removed and trimmed manually. Ultrasonic bonding was then performed on the edges of the molded respirator. The respirator was molded such that the secondary layer was toward the concave side of the respirator, relative to the bimodal fiber mixture web layer.

Properties of the thus-formed respirator were tested (with the respirator being exposed to the gas stream on its convex side, such that the bimodal fiber mixture web layer was positioned upstream of the secondary layer) and are listed in Table 3.

Properties of meltblown-fiber webs, bimodal fiber mixture webs (exceptions as noted above for Examples 5 and 6), and molded respirators comprising bimodal fiber mixture webs (exceptions again as noted above in Examples 5 and 6) are presented in Tables 1, 2, and 3. In these tables, EFD is Effective Fiber Diameter in microns, "d" signifies denier in units of grams per 9000 meter of fiber length, lpm denotes liters per minute, with other parameters as previously defined herein.

TABLE 1

Meltblown Fiber Web Properties

| Example # | Resin | Basis weight (g/m$^2$) | Thickness (mm) | Pressure Drop (mm H$_2$O @ 32 lpm) | Solidity (%) | EFD (µ) |
|---|---|---|---|---|---|---|
| 1 | Total EOD-12 | 63 | 1.3 | 0.35 | 5.1 | 17.0 |
| 2 | Exxon 3746 | 77 | 1.6 | 2.52 | 5.1 | 7.0 |
| 3 | Total EOD-12 | 62 | 1.3 | 0.34 | 5.2 | 17.2 |
| 4 | Exxon 3746 | 104 | 2.2 | 3.30 | 5.2 | 7.1 |
| 5 | Exxon 3155 | 258 | 4.1 | 3.30 | 6.8 | 11.9 |
| 6 | Total 3960 | 25 | 0.35 | 2.45 | 8.4 | 4.7 |
| 7 | Total 3960 | 50 | 1.1 | 0.25 | 4.9 | 17.2 |

TABLE 2

Bimodal Fiber Mixture Web Properties

| Example # | Basis weight (g/m$^2$) | BMF:Staple Weight Ratio | Staple Fiber Type | Thickness (mm) | Pressure Drop (mm H2O @ 32 lpm) | Solidity (%) | EFD (μ) |
|---|---|---|---|---|---|---|---|
| 1 | 130 | 50:50 | 6d Non-bondable | 8.8 | 0.19 | 1.6 | 24.6 |
| 2 | 150 | 50:50 | 4d Bondable | 4.4 | 1.90 | 3.9 | 11.0 |
| 3 | 122 | 50:50 | 4d Bondable | 6.4 | 0.22 | 2.1 | 23.7 |
| 4 | 150 | 70:30 | 4d Bondable | 3.4 | 3.55 | 5.7 | 9.0 |
| 5 | 258 | 100:00 | None | 4.1 | 3.30 | 6.8 | 11.9 |
| 6 | 25 | 100:00 | None | 0.35 | 2.45 | 8.4 | 4.7 |
| 7 | 101 | 50:50 | 6d Non-bondable | 7.0 | 0.17 | 1.6 | 22.9 |

TABLE 3

Molded Respirator Properties

| Example # | Secondary Filtration Layer Present | Pressure Drop @ 70 mg Salt Load (mmH$_2$O @ 85 lpm) | Pressure Drop @ 40 mg Weld Fume Load (Pa @ 30 lpm) |
|---|---|---|---|
| 1 | Yes | 15.9 | 31 |
| 2 | — | — | — |
| 3 | Yes | 21.9 | 54 |
| 4 | No | 43.5 | 73 |
| 5 | No | >50 | 114 |
| 7 | Yes | 24.7 | — |

A number of embodiments of the invention have been described. Nevertheless, it will be understood that various modifications may be made without departing from the invention. Accordingly, other embodiments are within the scope of the following claims.

What is claimed is:

1. A porous nonwoven web comprising staple fibers intermingled with meltblown attenuated fibers;
   wherein the meltblown attenuated fibers comprise a bimodal mixture of intermingled microfibers and mesofibers;
   and wherein there are at least five times as many microfibers as mesofibers and wherein the mesofibers comprise at least 30% by weight of the meltblown attenuated fibers,
   and wherein the mesofibers have a maximum diameter of about 50 μm.

2. The web of claim 1 wherein the microfibers and mesofibers are of the same polymeric composition.

3. The web of claim 1 wherein the microfibers and mesofibers are of different polymeric composition.

4. The web of claim 1 wherein the web comprises about 30 to about 70 weight % staple fibers.

5. The web of claim 1 wherein the staple fibers are non-bondable fibers.

6. The web of claim 1 wherein the staple fibers are bondable fibers.

7. The web of claim 1 wherein the staple fibers have an average geometric fiber diameter of 15 μm or larger.

8. The web of claim 1 wherein the mesofibers comprise at least 50% by weight of the meltblown attenuated fibers.

9. The web of claim 1 wherein the mesofibers comprise at least 70% by weight of the meltblown attenuated fibers.

10. The web of claim 1 wherein there are at least ten times as many microfibers as mesofibers.

11. The web of claim 1 wherein a fiber frequency histogram exhibits a microfiber mode of about 1 μm to about 2 μm.

12. The web of claim 1 wherein a fiber frequency histogram exhibits a mesofiber mode of at least 15 μm.

13. The web of claim 1 wherein the web comprises a solidity of less than 4%.

14. The web of claim 1 wherein the web comprises an EFD of about 7 to about 30 μm.

15. A process for forming a porous nonwoven web, comprising:
    flowing fiber-forming material through a meltblowing die comprising a die cavity in fluid communication with larger size orifices and in fluid communication with at least five times as many smaller size orifices,
        wherein a portion of the fiber-forming material flows through the larger size orifices to form larger diameter filaments, and a portion of the fiber-forming material flows through the smaller size orifices to form smaller diameter filaments;
    using air or other fluid to attenuate the filaments into a stream of intermingled meltblown fibers;
    introducing staple fibers into the stream of meltblown fibers,
        wherein the staple fibers and microfibers form a stream of intermingled fibers; and,
    collecting the mixed fibers as a nonwoven web containing an intermingled mixture of staple fibers and meltblown fibers;
        wherein the meltblown fibers comprise a bimodal mixture of intermingled microfibers and mesofibers, of the same polymeric composition and wherein the mesofibers have a maximum diameter of about 50 μm.

16. The process of claim 15 wherein the die cavity has at least ten times as many smaller size orifices as larger size orifices.

17. The process of claim 15 wherein the die cavity has at least twenty times as many smaller size orifices as larger size orifices.

18. The process of claim 15 wherein the ratio of larger:smaller orifice sizes is 2:1 or greater.

19. The process of claim 15 wherein the ratio of larger:smaller orifice sizes is 3:1 or greater.

20. A process for forming a porous nonwoven web, comprising:
- flowing fiber-forming material through a meltblowing die comprising a die cavity in fluid communication with larger size orifices and in fluid communication with at least five times as many smaller size orifices,
    - wherein a portion of the fiber-forming material flows through the larger size orifices to form larger diameter filaments, and a portion of the fiber-forming material flows through the smaller size orifices to form smaller diameter filaments;
- using air or other fluid to attenuate the filaments into a stream of intermingled meltblown fibers;
- introducing staple fibers into the stream of meltblown fibers,
    - wherein the staple fibers and meltblown form a stream of intermingled fibers; and,
- collecting the mixed fibers as a nonwoven web containing an intermingled mixture of staple fibers and meltblown microfibers and mesofibers;
    - wherein the microfibers and mesofibers are of the same polymeric composition,
    - wherein there are at least about five times as many microfibers as mesofibers and wherein the mesofibers comprise at least about 30% by weight of the meltblown fibers and wherein the mesofibers have a maximum diameter of about 50 μm.

* * * * *